(12) United States Patent
Abe

(10) Patent No.: US 10,429,632 B2
(45) Date of Patent: Oct. 1, 2019

(54) MICROSCOPY SYSTEM, MICROSCOPY METHOD, AND COMPUTER-READABLE RECORDING MEDIUM

(71) Applicant: OLYMPUS CORPORATION, Tokyo (JP)

(72) Inventor: Yoko Abe, Hino (JP)

(73) Assignee: Olympus Corporation, Tokyo (JP)

( * ) Notice: Subject to any disclaimer, the term of this patent is extended or adjusted under 35 U.S.C. 154(b) by 57 days.

(21) Appl. No.: 15/782,108

(22) Filed: Oct. 12, 2017

(65) Prior Publication Data
US 2018/0081161 A1 Mar. 22, 2018

Related U.S. Application Data

(63) Continuation of application No. PCT/JP2015/061640, filed on Apr. 15, 2015.

(51) Int. Cl.
*G02B 21/36* (2006.01)
*G06T 5/50* (2006.01)
(Continued)

(52) U.S. Cl.
CPC ......... *G02B 21/367* (2013.01); *G02B 21/36* (2013.01); *G06T 5/003* (2013.01); *G06T 5/50* (2013.01); *H04N 5/23229* (2013.01); *G02B 21/025* (2013.01); *G02B 21/088* (2013.01); *G02B 21/26* (2013.01); *G03B 15/00* (2013.01); *G06T 2207/10056* (2013.01); *G06T 2207/10148* (2013.01); *G06T 2207/20221* (2013.01)

(58) Field of Classification Search
None
See application file for complete search history.

(56) References Cited

U.S. PATENT DOCUMENTS

| 2014/0022236 A1* | 1/2014 | Liu ...................... G02B 21/367 345/419 |
| 2014/0022346 A1 | 1/2014 | Liu et al. |
| 2014/0306952 A1 | 10/2014 | Oka et al. |

FOREIGN PATENT DOCUMENTS

| JP | H08-161530 A | 6/1996 |
| JP | 2008-067915 A | 3/2008 |

(Continued)

OTHER PUBLICATIONS

International Search Report dated Jun. 9, 2015 issued in PCT/JP2015/061640.

*Primary Examiner* — James M Anderson, II
(74) *Attorney, Agent, or Firm* — Scully Scott Murphy & Presser P.C.

(57) ABSTRACT

A microscopy system includes: an image acquisition unit configured to acquire slice images generated by capturing an object image while shifting a focal position along an optical axis of an observation optical system included in a microscope; an image shift processing configured to relatively shift, with respect to one slice image among the slice images, another slice image in a plane including the one slice image; an all-in-focus image generation unit configured to generate all-in-focus images by combining the one slice image and the other slice image relatively shifted with respect to the one slice image under conditions in which shift amounts of the other slice image with respect to the one slice image are different; and a display unit configured to display the all-in-focus images.

5 Claims, 29 Drawing Sheets

(51) Int. Cl.
*H04N 5/232* (2006.01)
*G06T 5/00* (2006.01)
G03B 15/00 (2006.01)
G02B 21/02 (2006.01)
G02B 21/08 (2006.01)
G02B 21/26 (2006.01)

(56) References Cited

FOREIGN PATENT DOCUMENTS

| | | | |
|---|---|---|---|
| JP | 2008067915 A | * | 3/2008 |
| JP | 2014-021489 A | | 2/2014 |
| JP | 2014-021490 A | | 2/2014 |
| WO | WO 2013/069215 A1 | | 5/2013 |

* cited by examiner

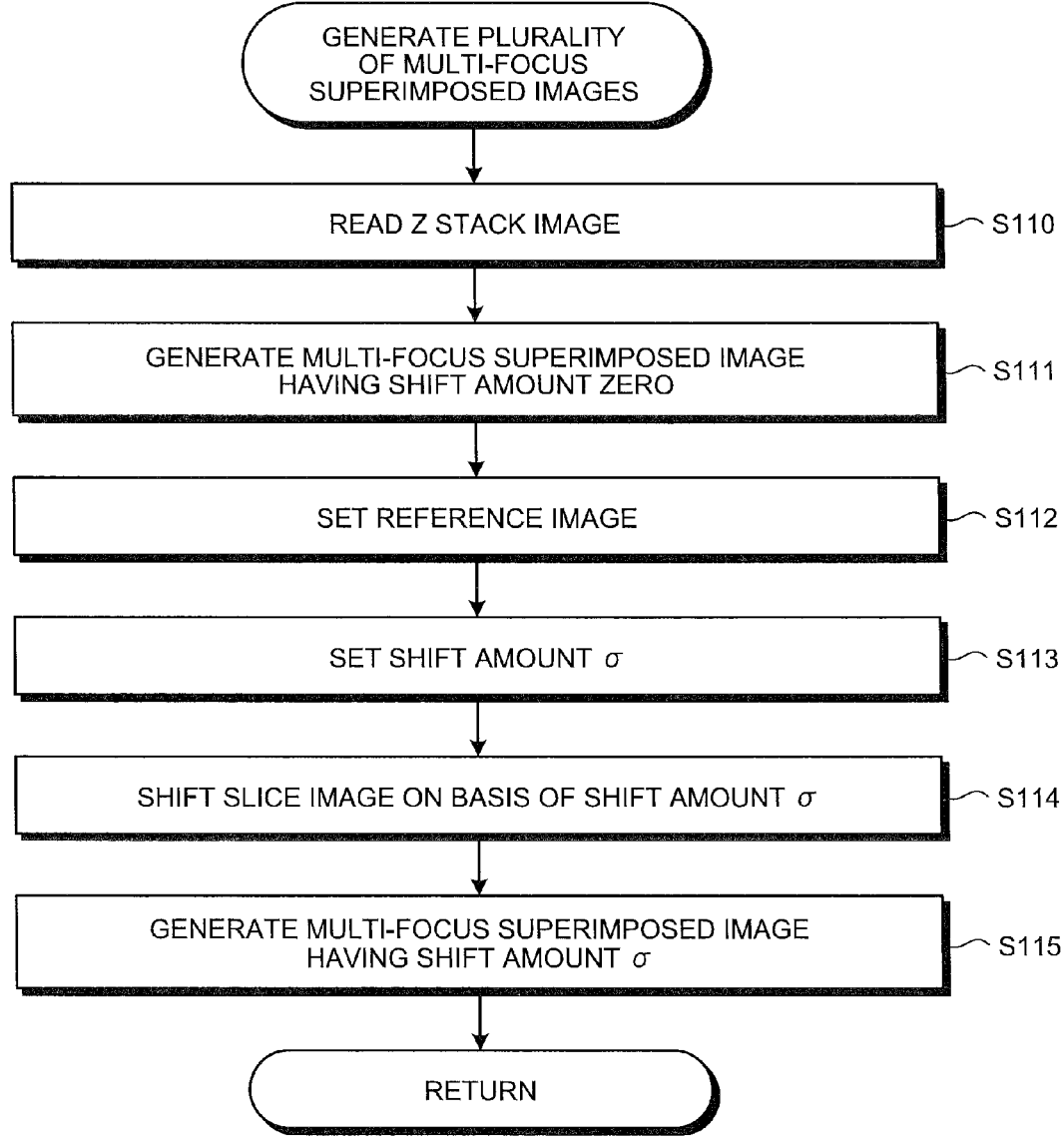

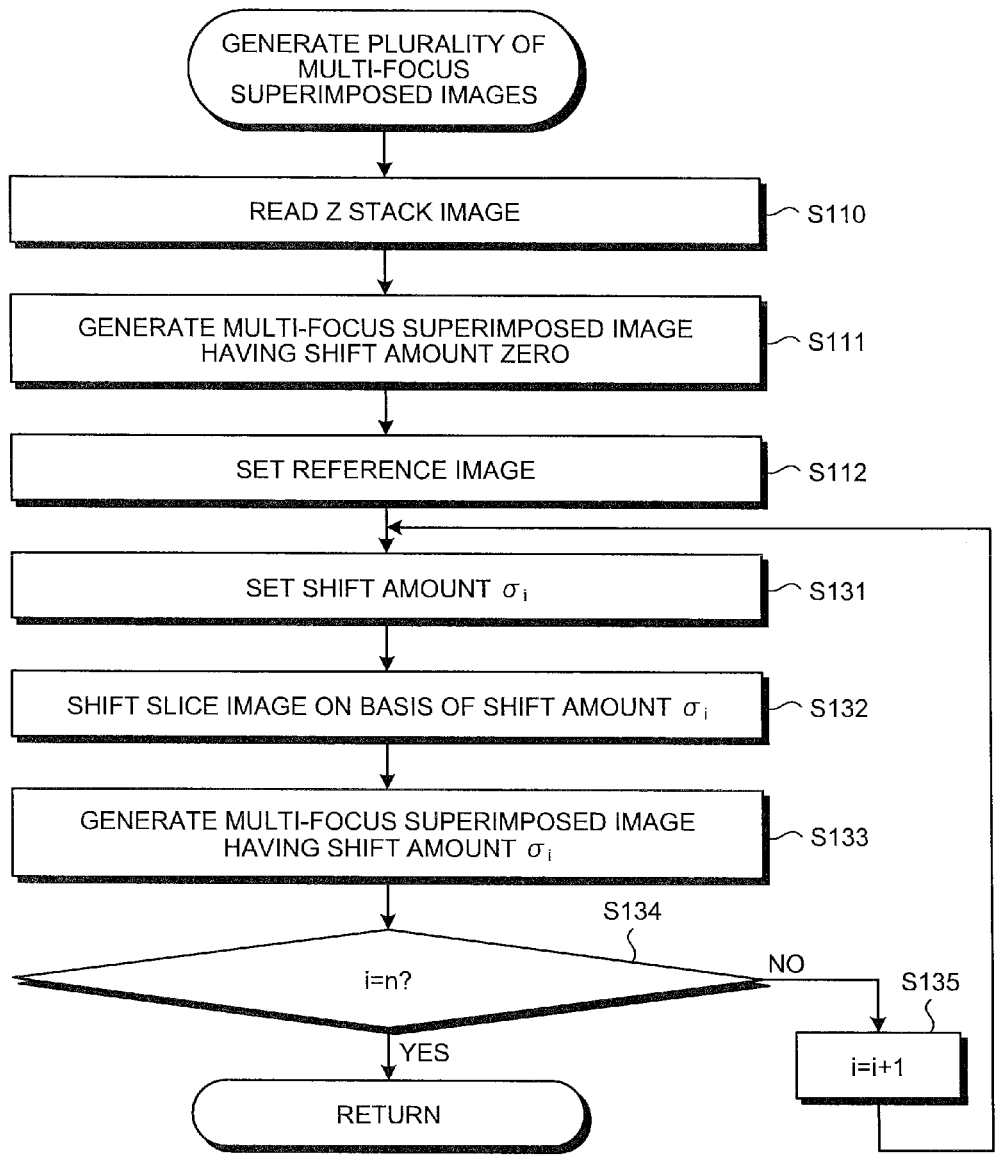

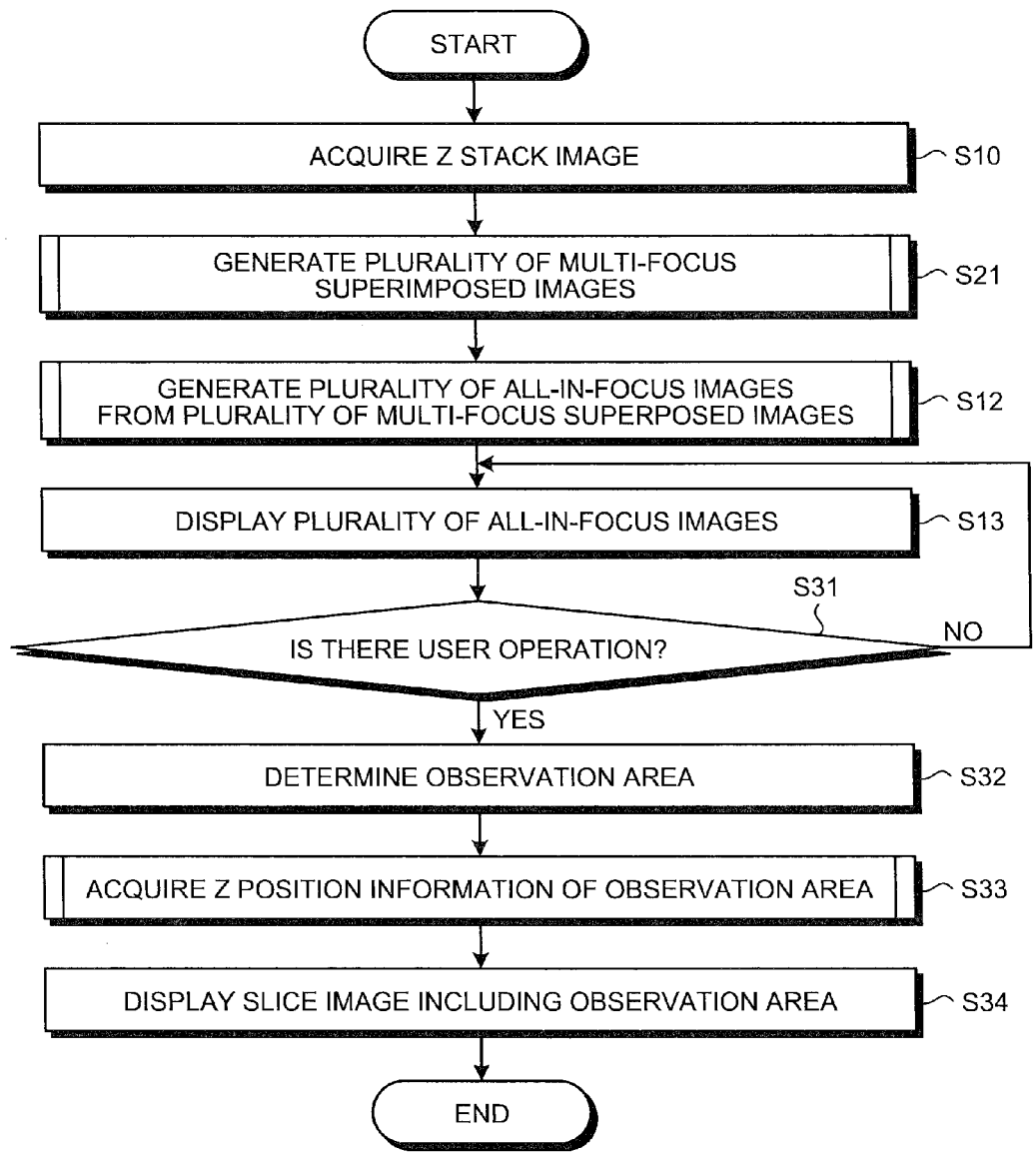

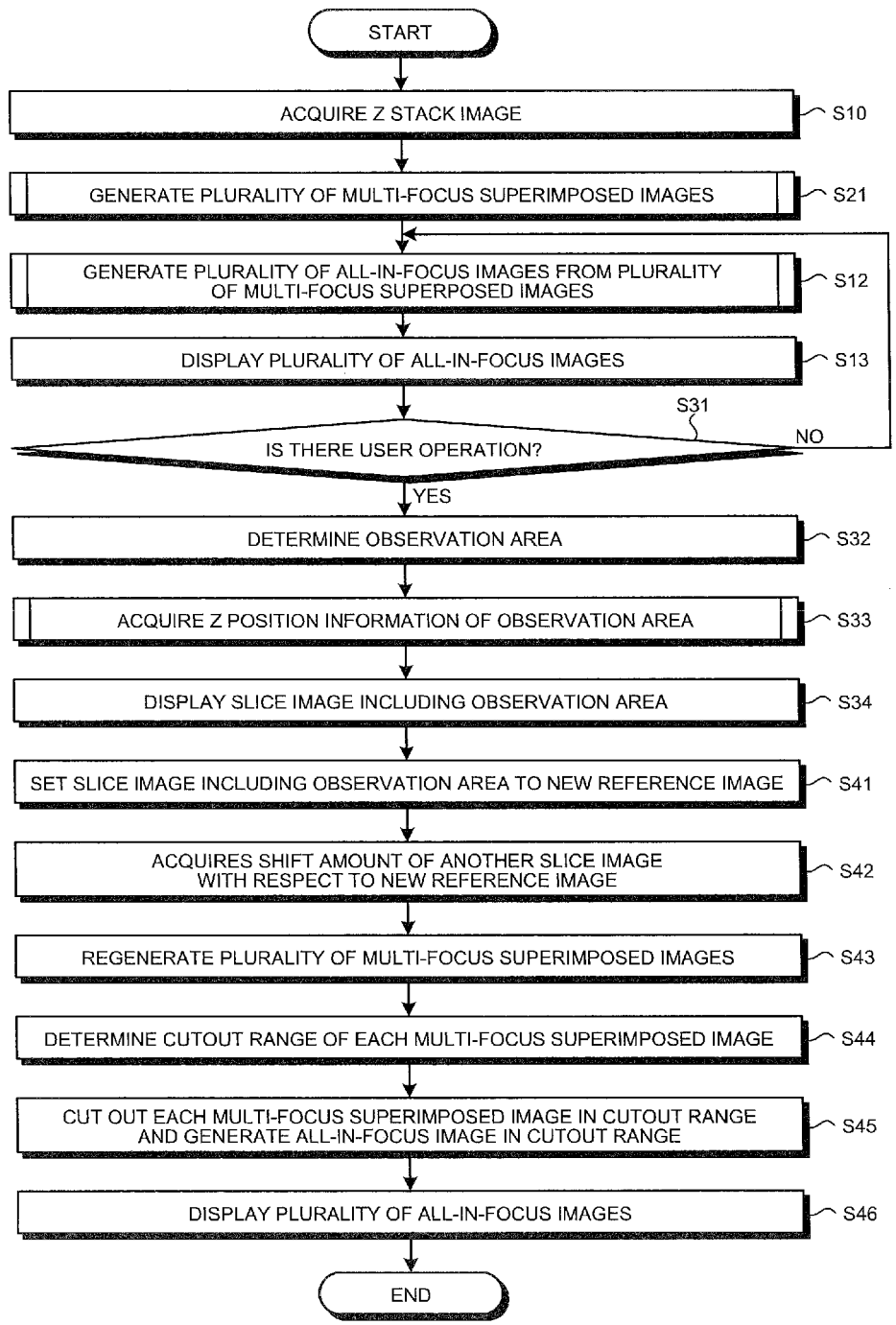

MICROSCOPY SYSTEM, MICROSCOPY METHOD, AND COMPUTER-READABLE RECORDING MEDIUM

CROSS-REFERENCE TO RELATED APPLICATION

This application is a continuation of PCT international application Ser. No. PCT/JP2015/061640 filed on Apr. 15, 2015 which designates the United States, incorporated herein by reference.

BACKGROUND

The present disclosure relates to a microscopy system, a microscopy method, and a computer-readable recording medium.

In the field of biology, medicine, and the like, there is a user need that when observing a thick object such as a cell nucleus or a stem cell by using a biological microscope having a focal depth level of several tens of μm, users want to promptly specify a region of interest located in a depth direction (Z direction) along the optical axis of an observation optical system. In response to such a need, there is known a technique with which a plurality of images having different focal planes is acquired by performing sequential imaging while shifting the focal position of the observation optical system along the optical axis, and based on the plurality of images, an all-in-focus image that is focused at each position in the Z direction is generated. The plurality of images having different focal planes acquired in this way is also collectively called a Z stack image.

Examples of the method of generating an all-in-focus image include a method of restoring, using a blur function, a multi-focus image generated by superimposing Z stack images, and a method of extracting a focal area from each of a plurality of images having different focal planes and performing composition. Hereinafter, each image having a different focal plane is also referred to as a slice image. For example, JP 2014-21489 A discloses a technique with which a focusing degree within each slice image is calculated, a candidate area to be combined is selected based on the focusing degree, weighting is performed on the candidate area according to the focusing degree, and composition is performed.

With such an all-in-focus image, the user may instantaneously grasp a position of a structure in the Z direction in the object on a two-dimensional XY plane.

Furthermore, as a technique related to the all-in-focus image, for example, JP 2014-21490 A discloses a technique with which a user may select, through a user interface, an area for an all-in-focus image generated from a Z stack image, and thus a slice image focusing the area is displayed.

SUMMARY

A microscopy system according to one aspect of the present disclosure may include: an image acquisition unit configured to acquire slice images generated by capturing an object image while shifting a focal position along an optical axis of an observation optical system included in a microscope; an image shift processing configured to relatively shift, with respect to one slice image among the slice images, another slice image in a plane including the one slice image; an all-in-focus image generation unit configured to generate all-in-focus images by combining the one slice image and the other slice image relatively shifted with respect to the one slice image under conditions in which shift amounts of the other slice image with respect to the one slice image are different; and a display unit configured to display the all-in-focus images.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 5 is a flowchart illustrating details of processing of generating a plurality of multi-focus superimposed images;

FIG. 10 is a flowchart illustrating details of processing of generating multi-focus superimposed images in a first modification of the first embodiment of the present disclosure;

FIG. 21 is a flowchart illustrating an operation of the microscopy system illustrated in FIG. 20;

FIG. 26 is a flowchart illustrating an operation of the microscopy system illustrated in FIG. 25;

DETAILED DESCRIPTION

Hereinafter, embodiments of a microscopy system, a microscopy method, and a microscopy program according to the present disclosure will be described in detail below with reference to the drawings. Note that the present disclosure is not limited to these embodiments. Furthermore, in the description of each drawing, the same reference signs are given to the same parts.

First Embodiment

Figure 1:
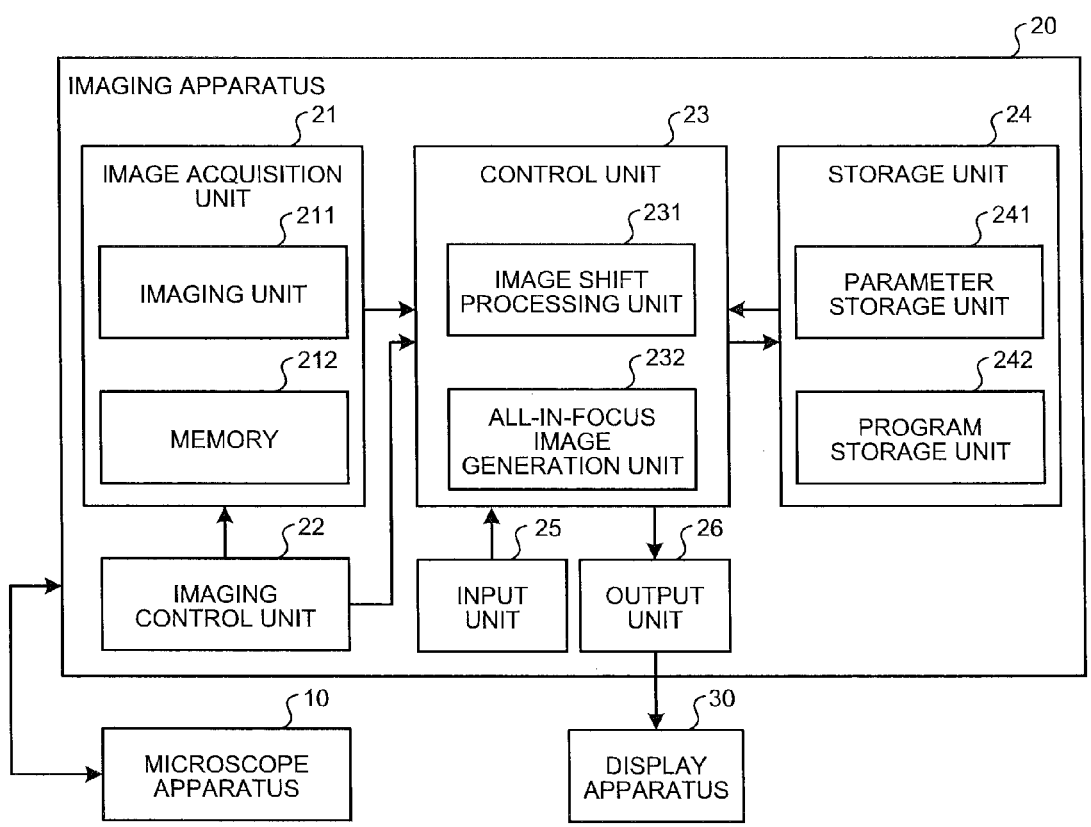
FIG. 1 is a block diagram illustrating an exemplary configuration of a microscopy system according to a first embodiment of the present disclosure.

FIG. 1 is a block diagram illustrating an exemplary configuration of a microscopy system according to a first embodiment of the present disclosure. As illustrated in FIG. 1, a microscopy system 1 according to the first embodiment includes a microscope apparatus 10 that generates an enlarged image of an object, an imaging apparatus 20 that acquires and processes an image of the enlarged image generated by the microscope apparatus 10, and a display apparatus 30 that displays the image processed by the imaging apparatus 20.

Figure 2:
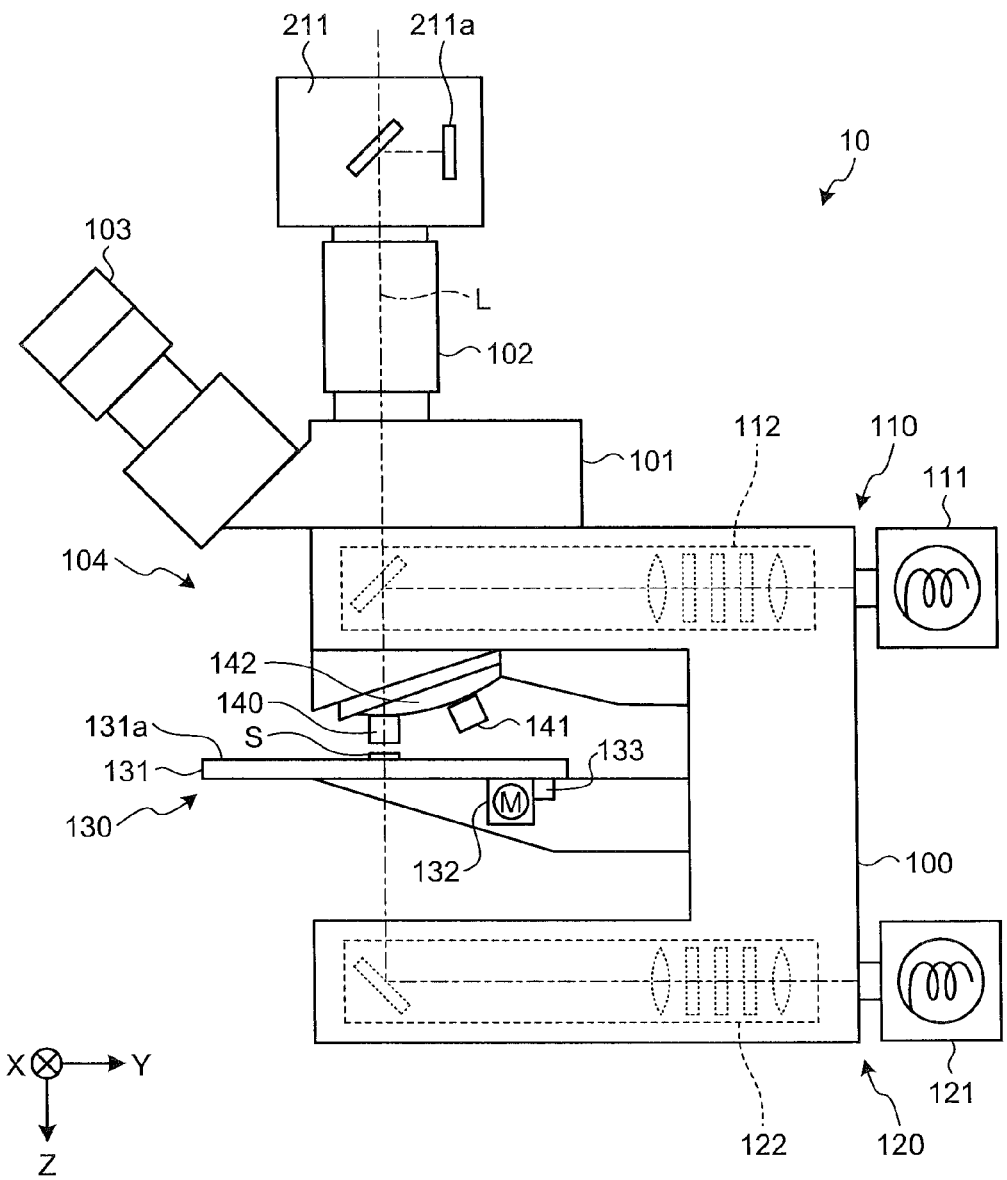
FIG. 2 is a schematic diagram illustrating an exemplary configuration of a microscope apparatus illustrated in FIG. 1.

FIG. 2 is a schematic diagram illustrating an exemplary configuration of the microscope apparatus 10. As illustrated in FIG. 2, the microscope apparatus 10 includes a substantially C-shaped arm 100, a lens barrel 102 and an eyepiece unit 103 supported on the arm 100 via a trinocular tube unit 101, an epi-illumination unit 110 and a transmitted-light illumination unit 120 provided on the arm 100, an electromotive stage unit 130 including a stage 131 on which an object S is placed, and an objective lens 140 that is provided on one end side of the lens barrel 102 so as to face the stage 131 via the trinocular tube unit 101 and forms an image of observation light from the object S. The objective lens 140, the lens barrel 102 connected via the trinocular tube unit 101, and an imaging unit 211 (described later) provided on the other end side of the lens barrel 102 constitute an observation optical system (imaging optical system) 104.

The trinocular tube unit 101 branches the observation light incident from the objective lens 140 in the direction of the eyepiece unit 103 for a user to directly observe the object S and in the direction of the imaging unit 211 described later.

The epi-illumination unit 110 includes a light source for epi-illumination 111 and an epi-illumination optical system 112, and irradiates the object S with epi-illumination light. The epi-illumination optical system 112 includes various optical members, specifically, a filter unit, a shutter, a field stop, an aperture diaphragm, and the like. These optical members collect the illumination light emitted from the light source for epi-illumination 111 and guide the illumination light toward an optical axis L of the observation optical system 104.

The transmitted-light illumination unit 120 includes a light source for transmitted-light illumination 121 and a transmitted-light illumination optical system 122, and irradiates the object S with transmitted illumination light. The transmitted-light illumination optical system 122 includes various optical members, specifically, a filter unit, a shutter, a field stop, an aperture diaphragm, and the like. These optical members collect the illumination light emitted from the light source for transmitted-light illumination 121 and guide the illumination light toward the optical axis L.

Either of these epi-illumination unit 110 and transmitted-light illumination unit 120 is selected and used according to a microscopic examination method. Note that only one of the epi-illumination unit 110 and the transmitted-light illumination unit 120 may be provided in the microscope apparatus 10.

The electromotive stage unit 130 includes the stage 131, a stage drive unit 132 that moves the stage 131, and a position detection unit 133. The stage drive unit 132 includes, for example, a motor, and is a moving unit that moves the stage 131 under the control of an imaging control unit 22 described later. An object placement surface 131a of the stage 131 is provided so as to be orthogonal to the optical axis of the objective lens 140. In the following description, the object placement surface 131a is an XY plane, and a normal direction of the XY plane, that is, a direction parallel to the optical axis is a Z direction. In the Z direction, a downward direction in the figure, that is, a direction away from the objective lens 140 is a plus direction.

By moving the stage 131 within the XY plane, the observation field of view of the objective lens 140 may be changed. Furthermore, by moving the stage 131 in the Z direction, the slice of the object S positioned at the focal point of the objective lens 140 may be changed along the optical axis.

Note that in the first embodiment, the stage 131 is configured to be movable by electrical control. However, it is possible to adopt a configuration in which the user manually moves the stage 131 using an adjustment knob or the like.

In FIG. 2, the position of the observation optical system 104 including the objective lens 140, the lens barrel 102, and the imaging unit 211 is fixed and the stage 131 is moved. However, the position of the stage 131 may be fixed and the observation optical system 104 may be moved. Alternatively, both the stage 131 and the observation optical system 104 may be moved in opposite directions to each other. That is, as long as the observation optical system 104 and the object S may move relative to each other, any configuration may be adopted.

The position detection unit 133 includes, for example, an encoder that detects the rotation amount of the stage drive unit 132 that includes a motor. The position detection unit 133 detects the position of the stage 131 and outputs a detection signal. Note that instead of the stage drive unit 132 and the position detection unit 133, a pulse generating unit and a stepping motor that generate pulses according to the control of the imaging control unit 22 described later may be provided.

The objective lens 140 is attached to a revolver 142 capable of holding a plurality of objective lenses (for example, objective lenses 140 and 141) having different magnifications. By rotating the revolver 142 and changing the objective lenses 140 and 141 opposed to the stage 131, the imaging magnification may be changed. Note that FIG. 2 illustrates a state in which the objective lens 140 faces the stage 131.

Referring again to FIG. 1, the imaging apparatus 20 includes an image acquisition unit 21 that acquires an image by imaging the object S, the imaging control unit 22 that controls the imaging operation of the image acquisition unit 21, a control unit 23 that controls various operations at the imaging apparatus 20 and processes the image acquired by the image acquisition unit 21, a storage unit 24 that stores various kinds of information such as image data of the image acquired by the image acquisition unit 21 and control programs, an input unit 25 that inputs instructions and information to the imaging apparatus 20, and an output unit 26 that outputs images based on the image data stored in the storage unit 24 and other various kinds of information to an external device.

The image acquisition unit 21 includes the imaging unit 211 and a memory 212. The imaging unit 211 includes an imaging element (imager) 211a including, for example, a CCD and a CMOS, and is configured using a camera capable of capturing a color image having a pixel level (pixel value) in each band of red (R), green (G), and blue (B) in each pixel that the imaging element 211a includes. Alternatively, the imaging unit 211 may be configured using a camera capable of capturing a monochrome image that outputs a luminance value Y as a pixel level (pixel value) in each pixel.

As illustrated in FIG. 2, the imaging unit 211 is provided at one end of the lens barrel 102 so that the optical axis L passes through the center of the light receiving surface of the imaging element 211a. The imaging unit 211 photoelectrically converts observation light incident on the light receiving surface through the members from the objective lens 140 to the lens barrel 102, thereby generating image data of an image that has entered the field of view of the objective lens 140.

The memory 212 includes a recording device, for example, a semiconductor memory such as a flash memory, a RAM, and a ROM that may update recording. The memory 212 temporarily stores the image data generated by the imaging unit 211.

The imaging control unit 22 outputs a control signal to the microscope apparatus 10 to move the stage 131, thereby changing the area and the focal position of the object S entering the field of view of the objective lens 140 and causing the imaging unit 211 to perform imaging. In this way, the imaging control unit 22 performs control for sequentially acquiring a plurality of images. Hereinafter, a set of a plurality of images having the same coordinates of the object S in the XY plane and having different focal positions will also be referred to as a Z stack image. An image at each focal position included in the Z stack image is also referred to as a slice image.

The control unit 23 includes, for example, hardware such as a CPU, and reads a program stored in the storage unit 24, thereby collectively controlling the operations of the imaging apparatus 20 and the entire microscopy system 1 based on various parameters stored in the storage unit 24, information input from the input unit 25, and the like. Furthermore, the control unit 23 performs processing of generating an image by subjecting the image data input from the image acquisition unit 21 to predetermined image processing, and further combining a plurality of the generated images to generate an all-in-focus image.

Specifically, the control unit 23 includes an image shift processing unit 231 that relatively shifts the positions of the plurality of slice images included in the Z stack image in the image plane, and an all-in-focus image generation unit 232 that combines the plurality of slice images to generate a multi-focus superimposed image and also generates an all-in-focus image by restoring the multi-focus superimposed image using a point spread function representing blur of the image.

The storage unit 24 includes a recording device, for example, a semiconductor memory such as a flash memory, a RAM, and a ROM that may update recording, a recording medium, which is built-in or connected via a data communication terminal, such as a hard disk, an MO, a CD-R, and a DVD-R, and a writing/reading apparatus that writes information on the recording medium and reads the information recorded on the recording medium. The storage unit 24 includes a parameter storage unit 241 that stores parameters used for calculation in the control unit 23, and a program storage unit 242 that stores various programs. The parameter storage unit 241 stores parameters such as a shift amount according to the focal position when the slice image is shifted in the image shift processing unit 231. Furthermore, the program storage unit 242 stores a control program for causing the imaging apparatus 20 to execute a predetermined operation, an image processing program, and the like.

The input unit 25 includes an input device such as a keyboard, various buttons, and various switches, and a pointing device such as a mouse and a touch panel, and inputs, to the control unit 23, a signal according to an operation performed on these devices.

The output unit 26 is an external interface that outputs, to an external device such as the display apparatus 30, an image based on image data acquired by the image acquisition unit 21, an all-in-focus image generated by the control unit 23, and other various kinds of information, and causes the external device to display these images and the other various kinds of information in a predetermined format.

Such an imaging apparatus 20 may be configured by combining a general-purpose digital camera with a general-purpose apparatus such as a personal computer and a workstation, via an external interface.

The display apparatus 30 includes, for example, an LCD, an EL display, or a CRT display, and displays an image output from the output unit 26 and related information. Note that in the first embodiment, the display apparatus 30 is provided outside the imaging apparatus 20. However, the display apparatus 30 may be provided inside the imaging apparatus 20.

Figure 3:
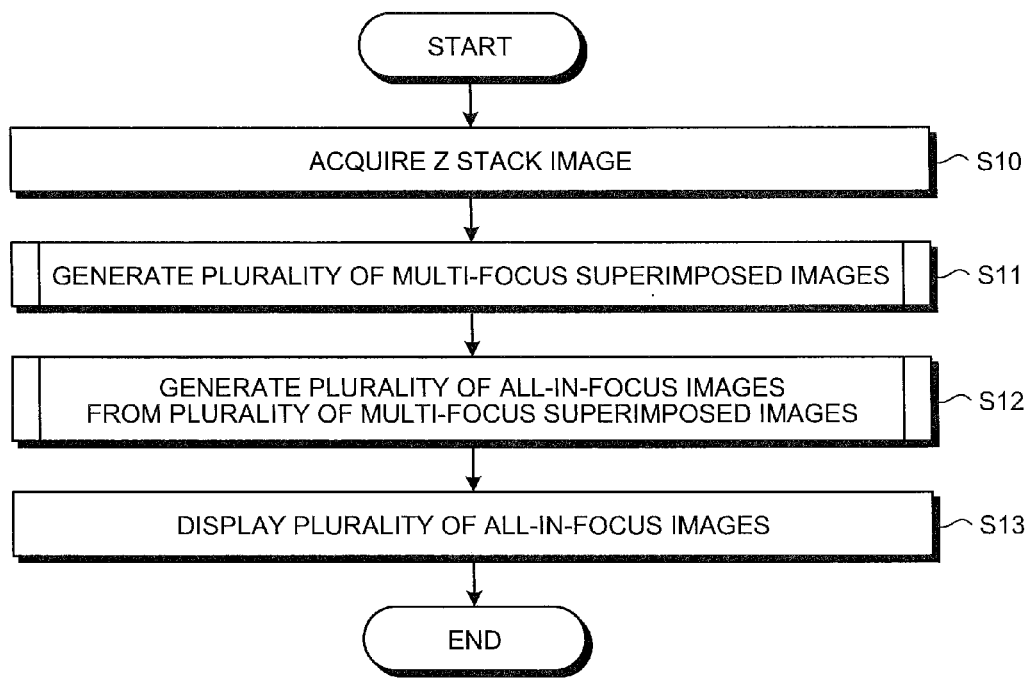
FIG. 3 is a flowchart illustrating an operation of the microscopy system illustrated in FIG. 1.

Next, the operation of the microscopy system 1 will be described. FIG. 3 is a flowchart illustrating the operation of the microscopy system 1.

Figure 4:
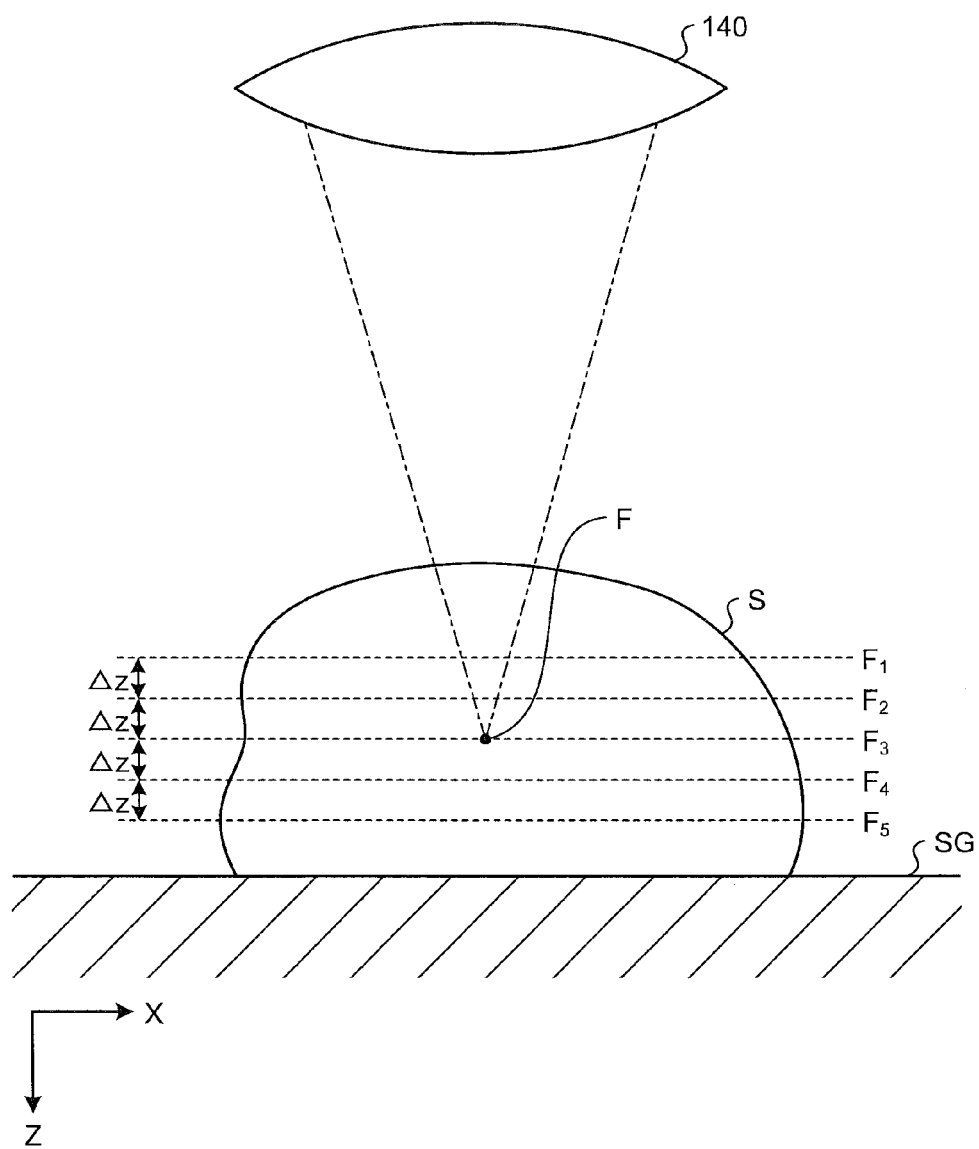
FIG. 4 is a schematic diagram for describing an operation of acquiring a Z stack image.

First, in step S10, under the control of the imaging control unit 22, the image acquisition unit 21 acquires the Z stack image by imaging the object S set in the stage 131 (refer to FIG. 2) of the microscope apparatus 10. FIG. 4 is a schematic diagram for describing the operation of acquiring the Z stack image, and illustrates the object S placed on a slide glass SG.

As illustrated in FIG. 4, each time imaging is performed once, a distance between the objective lens 140 and the stage 131 is changed by $\Delta z$ and a focal position F of the objective lens 140 is moved along the Z direction, whereby images of the object S at a plurality of slice positions ($Z=F_j$) may be acquired. Herein, a subscript j of the slice position $F_j$ represents slice order counted from the surface of the object S, and in FIG. 4, j=1 to 5. FIG. 4 illustrates a case where five slice images are acquired by performing imaging five times by setting the focal position F sequentially to the slice positions $F_1$ to $F_5$. However, the number of acquired slice images (upper limit of the subscripts j) may be set to any number.

Furthermore, in the first embodiment, the Z stack image is acquired in real time while imaging is performed in the imaging unit 211 provided in the microscope apparatus 10. However, a Z stack image stored in a server or the like may be acquired via a network. Alternatively, a Z stack image may be acquired via a storage medium. In these cases, the image acquisition unit 21 includes an interface that inputs and outputs information to and from an external network, a reading device that reads information stored in the storage medium, or the like.

In subsequent step S11, the control unit 23 generates, from the Z stack image acquired in step S10, a plurality of multi-focus superimposed images in which the slice images are superimposed differently. Specifically, the control unit 23 generates a multi-focus superimposed image obtained by shifting a part of the slice images in the Z stack image by a predetermined (non-zero) shift amount with respect to other images and a multi-focus superimposed image obtained by setting a shift amount between the slice images to zero, that is, a multi-focus superimposed image obtained by shifting none of the slice images.

Figure 6A:
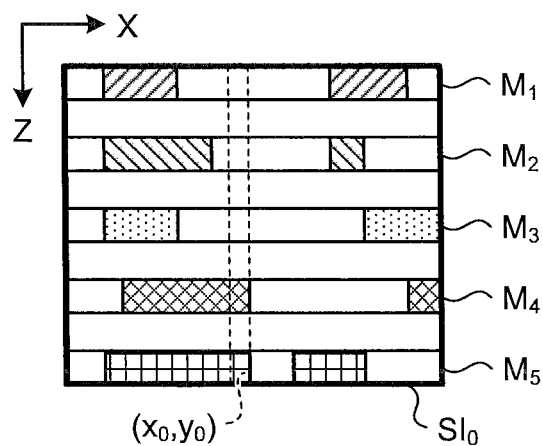
FIGS. 6A and 6B are schematic diagrams for describing the processing of generating the plurality of multi-focus superimposed images.
Figure 6B:
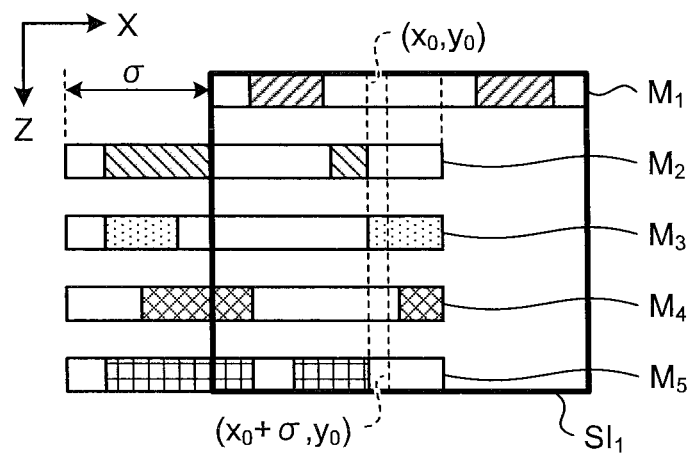

FIG. 5 is a flowchart illustrating details of processing of generating a plurality of multi-focus superimposed images in step S11. Furthermore, FIGS. 6A and 6B are schematic diagrams for describing the processing of generating a plurality of multi-focus superimposed images, and illustrates a slice image $M_j$ (j=1 to 5) at the slice position $F_j$ illustrated in FIG. 4 viewed from the side (XZ plane). In the following description, as an example, processing for the slice image $M_j$ illustrated in FIGS. 6A and 6B will be described. The subscript j of the slice image $M_j$ indicates stack order in the Z stack image and corresponds to the slice order. Furthermore, shading illustrated in each slice image $M_j$ indicates an area in which a structure existing in the slice position $F_j$ is imaged.

First, in step S110, the control unit 23 reads slice images $M_1$ to $M_5$ as the Z stack image from the image acquisition unit 21.

In subsequent step S111, the control unit 23 generates a multi-focus superimposed image $SI_0$ having no shift amount. Specifically, the all-in-focus image generation unit 232 calculates the pixel value of each pixel in the multi-focus superimposed image $SI_0$ by averaging the pixel values of pixels the positions of which correspond to each other among the slice images $M_1$ to $M_5$. For example, as illustrated in FIG. 6A, by adding the pixel values of the pixels at the coordinates $(x_0, y_0)$ in each of the slice images $M_1$ to $M_5$, the pixel value of the pixel at the coordinates $(x_0, y_0)$ in the multi-focus superimposed image $SI_0$ is obtained. The image data of the multi-focus superimposed image $SI_0$ generated in this way is temporarily stored in the storage unit 24.

In subsequent step S112, the image shift processing unit 231 sets any slice image $M_j$ among the Z stack image as a reference image $M_k$ (k represents any of 1 to 5). Specifically, as the reference image $M_k$, any slice image $M_j$ such as a slice image $M_1$ having the shallowest slice position ($Z=F_1$), a slice image $M_5$ having the deepest slice position ($Z=F_5$), or a slice image $M_3$ the slice position of which is near the center ($Z=F_3$) is set in advance. Alternatively, the reference image $M_k$ may be appropriately set according to information input from the input unit 25 in response to a user operation. In the first embodiment, as an example, it is assumed that the slice image $M_1$ is set as the reference image $M_k$.

In subsequent step S113, the image shift processing unit 231 sets a shift amount σ (pixel) by which another slice image $M_j$ is shifted with respect to the reference image $M_k$. As the shift amount σ, the value stored in advance in the parameter storage unit 241 may be read and set, or any value may be set according to the information (user instruction information) input from the input unit 25.

Figure 7:
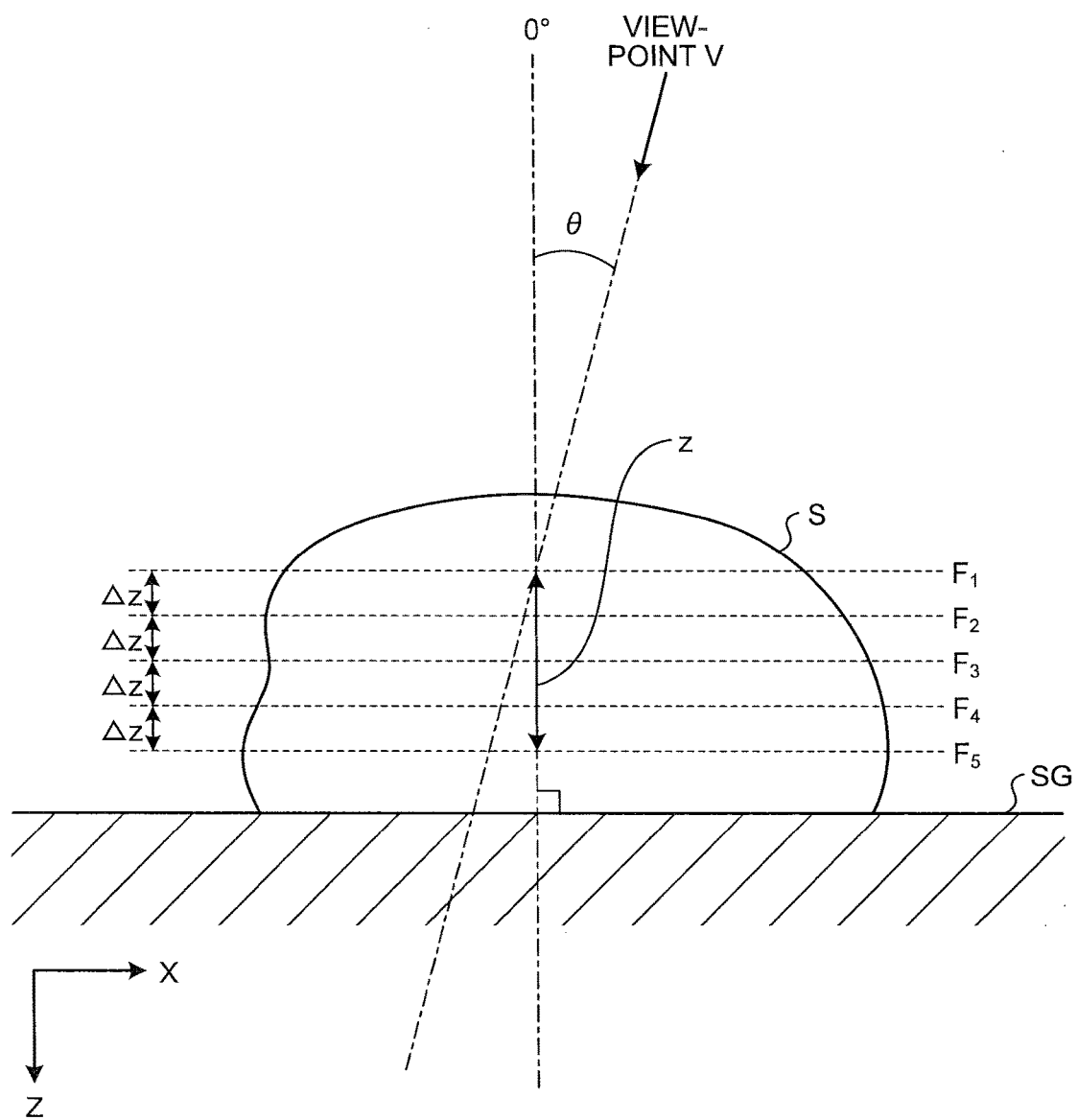
FIG. 7 is a schematic diagram for describing a method of setting a shift amount of a slice image.

FIG. 7 is a schematic diagram for describing a method of setting the shift amount σ for the slice image $M_j$. When any value is set as the shift amount σ, for example, a direction of a virtual viewpoint V when the user observes the object S (an angle θ formed with a direction directly above the object S) is input. In this case, the shift amount σ is given by the following formula (1), using a distance z from the slice position $F_k$ of the reference image $M_k$ to the slice position $F_j$ of another slice image $M_j$, the angle θ, and a pixel pitch p (μm/pixel) of the imaging element provided to the imaging unit 211.

$$\sigma = (z \cdot \tan \theta)/p \qquad (1)$$

Note that in FIG. 7, the distance z between the slice position $F_1$ and the slice position $F_5$ is illustrated.

In subsequent step S114, the image shift processing unit 231 shifts the slice image based on the shift amount σ determined in step S113. FIG. 6B illustrates a state in which the other slice images $M_2$ to $M_5$ are shifted in the minus X direction by the shift amount σ with respect to the slice image $M_1$ set as the reference image.

In subsequent step S115, the all-in-focus image generation unit 232 generates a multi-focus superimposed image $SI_1$ having the shift amount σ from the Z stack image after the shift processing of the slice image. That is, by averaging the pixel values of pixels the positions of which correspond to each other between the reference image $M_k$ and the slice image $M_j$ after the shift processing, the pixel value of each pixel in the multi-focus superimposed image $SI_1$ is calculated. Specifically, in the case of FIG. 6B, by averaging the pixel value of the pixel at the coordinates $(x_0, y_0)$ in the slice image $M_1$ as the reference image and the pixel values of the pixels at the coordinates $(x_0+\sigma, y_0)$ in the respective slice images $M_2$ to $M_5$, the pixel value of the pixel at the coordinates $(x_0, y_0)$ in the multi-focus superimposed image $SI_1$ is obtained. The image data of the multi-focus superimposed image $SI_1$ generated in this way is temporarily stored in the storage unit 24. Thereafter, the operation of the control unit 23 returns to a main routine.

In step S12 subsequent to step S11, the all-in-focus image generation unit 232 generates a plurality of all-in-focus images from a plurality of the multi-focus superimposed images $SI_0$ and $SI_1$ generated in step S11.

Figure 8:
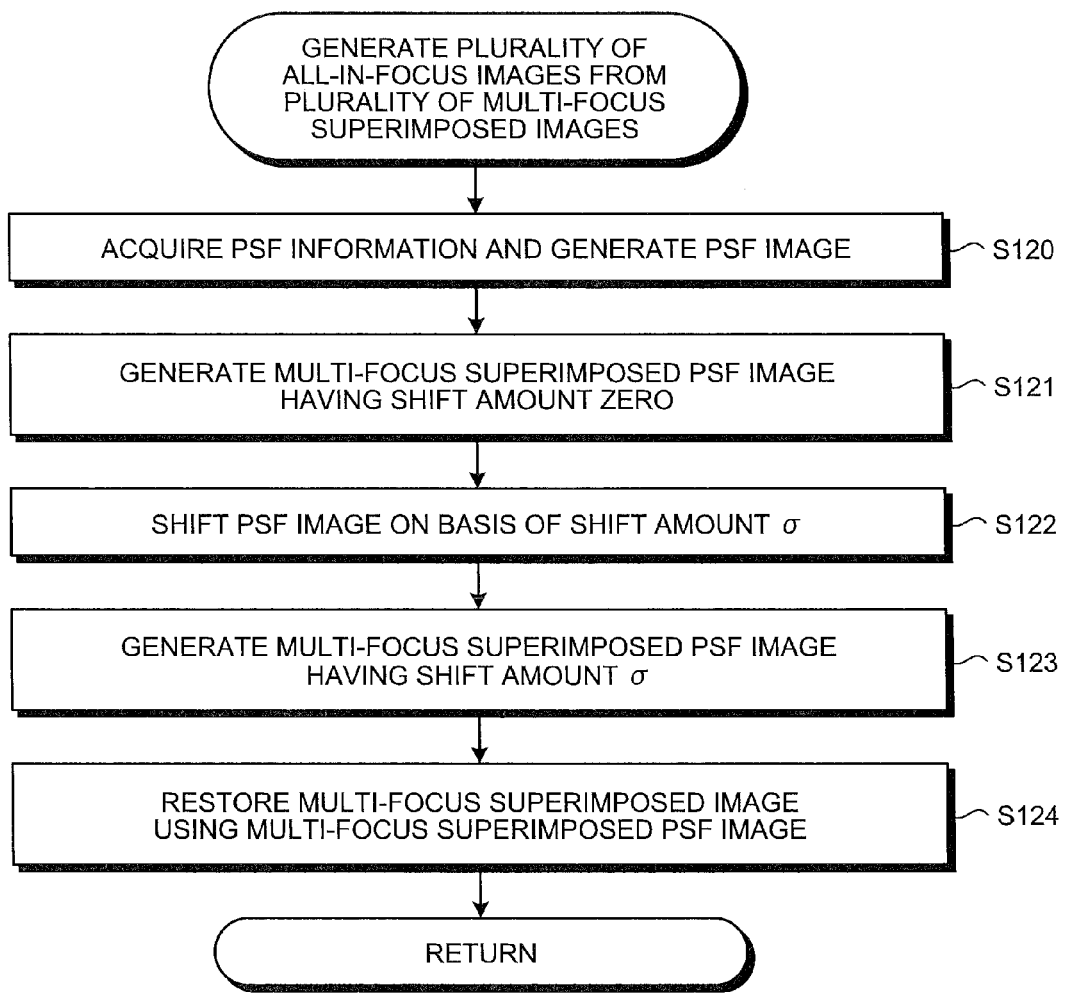
FIG. 8 is a flowchart illustrating details of processing of generating a plurality of all-in-focus images.

FIG. 8 is a flowchart illustrating details of processing of generating a plurality of all-in-focus images in step S12. First, in step S120, the all-in-focus image generation unit 232 acquires point spread function (PSF) information representing image blur in each slice image $M_j$, and generates a PSF image based on the PSF information. The point spread function is stored in advance in the parameter storage unit 241 in association with imaging conditions such as the magnification of the objective lens 140 in the microscope apparatus 10 and the slice position $F_j$. The all-in-focus image generation unit 232 reads the point spread function according to the slice position $F_j$ from the parameter storage unit 241 based on imaging conditions such as the magnification of the objective lens 140, and calculates a pixel value corresponding to each pixel position in the slice image $M_j$, based on the point spread function. In this way, the all-in-focus image generation unit 232 generates a PSF image.

In subsequent step S121, the all-in-focus image generation unit 232 generates a multi-focus superimposed PSF image $PI_0$ having a shift amount of zero corresponding to the multi-focus superimposed image $SI_0$. Specifically, by averaging the pixel values of pixels the positions of which correspond to each other among the plurality of PSF images generated in step S121, a pixel value of each pixel in the multi-focus superimposed PSF image $PI_0$ is calculated.

In subsequent step S122, the all-in-focus image generation unit 232 acquires the shift amount σ used when generating the multi-focus superimposed image $SI_1$, and shifts the PSF image based on the shift amount σ. That is, similarly to the case of generating the multi-focus superimposed image $SI_1$, the PSF image corresponding to another slice image $M_j$ is shifted by the shift amount σ with respect to the PSF image corresponding to the reference image $M_k$.

In subsequent step S123, the all-in-focus image generation unit 232 generates a multi-focus superimposed PSF image $PI_1$ having the shift amount σ, using the plurality of PSF images after the shift processing in step S122. Specifically, by averaging the pixel values of pixels the positions of which correspond to each other between the PSF image corresponding to the reference image $M_k$ and the PSF image after the shift processing corresponding to another slice image $M_j$, a pixel value of each pixel in the multi-focus superimposed PSF image $PI_1$ is calculated.

In step S124, the all-in-focus image generation unit 232 restores the multi-focus superimposed images $SI_0$ and $SI_1$ generated in step S11 using the multi-focus superimposed PSF images $PI_0$ and $PI_1$ respectively. That is, the all-in-focus image generation unit 232 generates an all-in-focus image $AI_0$ by restoring the multi-focus superimposed image $SI_0$ using the multi-focus superimposed PSF image $PI_0$ having a shift amount of zero. The all-in-focus image generation unit 232 also generates an all-in-focus image $AI_i$ by restoring a multi-focus superimposed image $SI_i$ using a multi-focus superimposed PSF image $PI_i$ having the shift amount σ. Thereafter, the operation of the control unit 23 returns to a main routine.

In step S13 subsequent to step S12, the imaging apparatus 20 outputs the image data of the plurality of all-in-focus images $AI_0$ and $AI_1$ generated in step S12 to the display apparatus 30, and causes the display apparatus 30 to display the all-in-focus images $AI_0$ and $AI_1$. A method of displaying the all-in-focus images $AI_0$ and $AI_1$ is not particularly limited. For example, the all-in-focus images $AI_0$ and $AI_1$ may be displayed side by side, or the all-in-focus images $AI_0$ and $AI_1$ may be alternately displayed in the same area. When the all-in-focus images $AI_0$ and $AI_1$ are alternately displayed in the same area, the all-in-focus images $AI_0$ and $AI_1$ may be automatically switched at predetermined intervals or may be manually switched by the user using the input unit 25.

Figure 9:
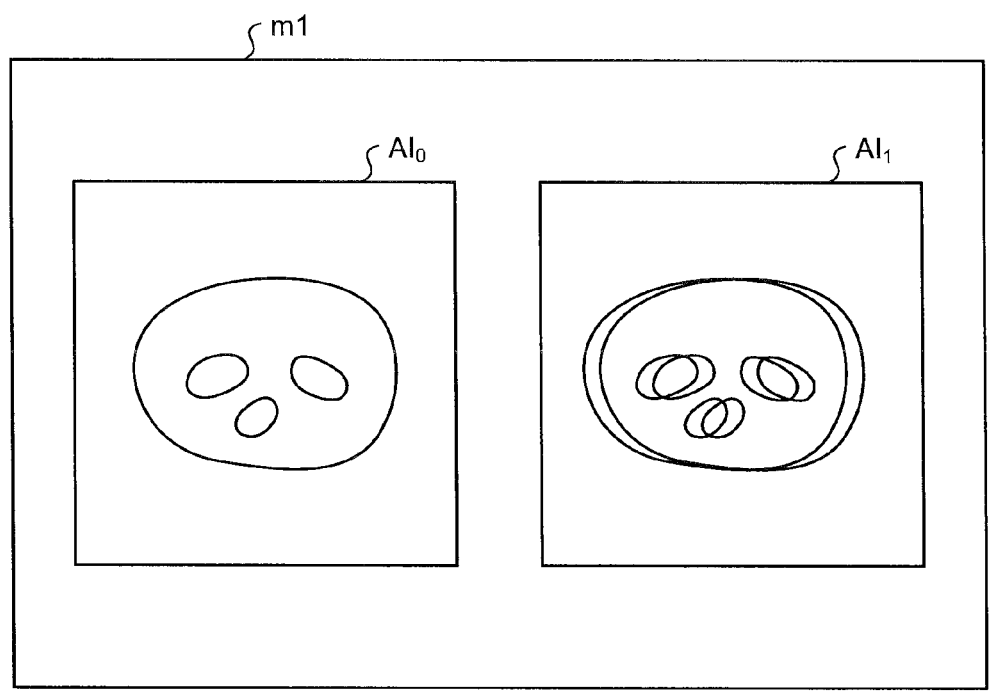
FIG. 9 is a schematic diagram illustrating an example in which two all-in-focus images are displayed side by side in a display apparatus illustrated in FIG. 1.

FIG. 9 is a schematic diagram illustrating a display example of all-in-focus images in the display apparatus 30. On a screen m1 illustrated in FIG. 9, two all-in-focus images $AI_0$ and $AI_1$ are displayed side by side. Thereafter, the operation of the microscopy system 1 ends.

As described above, according to the first embodiment of the present disclosure, any slice image in the Z stack images is set as a reference image, other slice images are shifted with respect to the reference image in the plane of the reference image, and then the Z stack images are superimposed. In this way, an all-in-focus image is acquired. At this time, a plurality of all-in-focus images having different relative shift amounts of other slice images with respect to the reference image is generated from one set of Z stack images and then displayed. As a result, it is possible to reproduce a state of virtually viewing the object S from a plurality of viewpoints. Specifically, in the first embodiment, the shift amounts are zero and σ. Therefore, by referring to these all-in-focus images, the user may visually and intuitively grasp a position of a structure in the Z direction in the object S, an anteroposterior relationship between structures, an overlapping state of the structures, and the like.

Furthermore, according to the first embodiment, it is possible to greatly suppress the amount of computation and the amount of data, as compared with the case where 3D volume data is generated and displayed based on the Z stack image.

Note that in the first embodiment, the all-in-focus image is generated by restoring the multi-focus superimposed image using the multi-focus superimposed PSF image generated from the PSF image. However, for example, the all-in-focus image may be generated by superimposing after each slice image is restored using the PSF image. Furthermore, the all-in-focus image generating method is not limited to this method and a method of extracting a focal area from each shifted slice image and performing composition may be used.

In the first embodiment, in order to promote understanding, the case where the slice image is shifted only in the X direction has been described. However, similar processing may be performed in the Y direction. In this case, it is possible to generate an all-in-focus image corresponding to the case where the virtual viewpoint with respect to the object S is moved along the Y direction. Furthermore, by shifting the slice image in two directions, i.e., the X direction and the Y direction, it is also possible to generate an all-in-focus image corresponding to the case where the virtual viewpoint with respect to the object S is moved in the horizontal plane.

Furthermore, in the first embodiment, one all-in-focus image having the shift amount σ with the slice image $M_1$ being the reference image $M_k$ is generated. However, a plurality of all-in-focus images having the shift amount σ may be generated by sequentially setting a plurality of slice images appropriately selected from among the slice images $M_1$ to $M_5$ to the reference image $M_k$.

First Modification

Next, a first modification of the first embodiment of the present disclosure will be described. The configuration and operation of a microscopy system according to the first modification are generally similar to those in the first embodiment (refer to FIGS. 1 and 3), and details of processing of generating a plurality of multi-focus superimposed images in step S11 are different from those in the first embodiment.

FIG. 10 is a flowchart illustrating details of the processing of generating a multi-focus superimposed image in the first modification. Note that steps S110 to S112 illustrated in FIG. 10 are similar to those in the first embodiment (refer to FIG. 5).

In step S131 subsequent to step S112, the image shift processing unit 231 sets a shift amount $\sigma_i$ (i=1, 2, ..., n) by which another slice image $M_j$ is shifted with respect to the reference image $M_k$. FIGS. 11A-11D are schematic diagrams for describing a method of setting the shift amount $\sigma_i$ of the slice image in the first modification. Herein, reference sign i is a variable representing the number of times another slice image $M_j$ is shifted with respect to the reference image $M_k$. i=1 is set as the initial value and i=n is set as the maximum value. As the shift amount $\sigma_i$, a predetermined value may be determined in advance, or any value may be determined according to information input from the input unit 25 in response to a user operation.

Figure 11A:
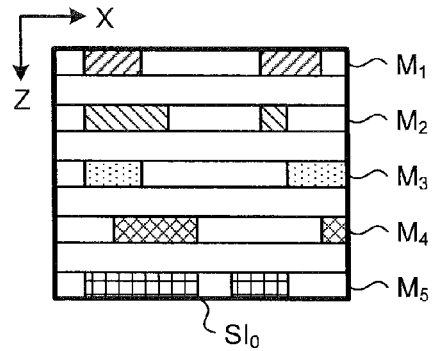
FIGS. 11A-11D are schematic diagrams for describing a method of setting a shift amount of a slice image in the first modification of the first embodiment of the present disclosure.
Figure 11B:
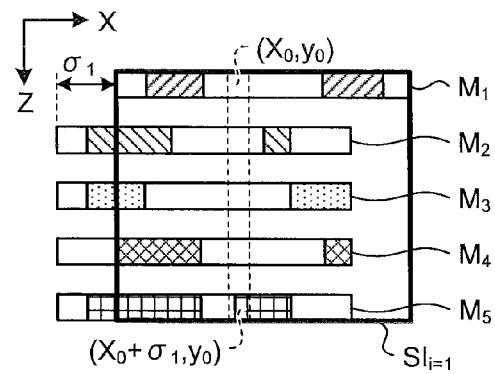

In subsequent step S132, the image shift processing unit 231 shifts another slice image $M_j$ with respect to the reference image $M_k$ based on the shift amount $\sigma_i$ determined in step S131. FIG. 11B illustrates a state in which the slice images $M_2$ to $M_5$ in the Z stack image illustrated in FIG. 11A are shifted in the minus X direction by the shift amount $\sigma_1$.

In subsequent step S133, the all-in-focus image generation unit 232 generates a multi-focus superimposed image $SI_i$ having the shift amount $\sigma_i$ from the Z stack image after the shift processing of the slice image. That is, by averaging the pixel values of pixels the positions of which correspond to each other between the reference image $M_k$ and the slice image $M_j$ after processing of shifting by the shift amount $\sigma_i$, the pixel value of each pixel in the multi-focus superimposed image $SI_i$ is calculated. In the case of FIG. 11B, by averaging the pixel value of the pixel at the coordinates $(x_0, y_0)$ in the slice image $M_1$ as the reference image and the pixel values of the pixels at the coordinates $(x_0+\sigma_1, y_0)$ in the slice images $M_2$ to $M_5$, the pixel value of the pixel at the coordinates $(x_0, y_0)$ in the multi-focus superimposed image $SI_{i=1}$ is obtained. The image data of the multi-focus superimposed image $SI_i$ generated in this way is temporarily stored in the storage unit 24.

Figure 11C:
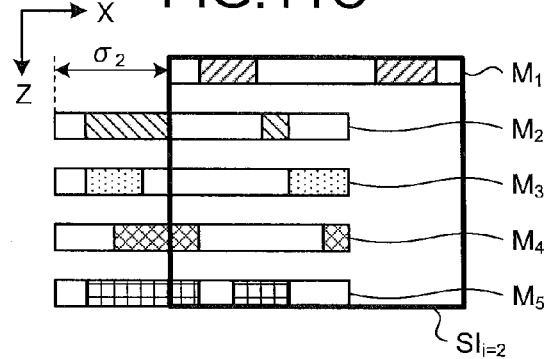
Figure 11D:
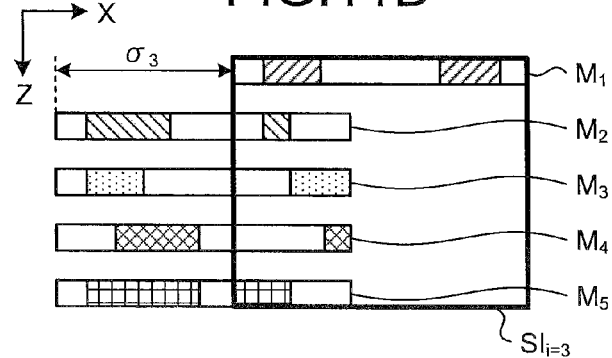

In subsequent step S134, the control unit 23 determines whether the variable i has reached the maximum value n. When the variable i has not reached the maximum value n (step S134: No), the control unit 23 increments the variable i (step S135). Thereafter, the operation of the control unit 23 returns to step S131. By repeating steps S131 to S133 in this way, a plurality of multi-focus superimposed images $SI_i$ having different shift amounts $\sigma_i$ with respect to the reference image $M_k$ is generated. FIG. 11C illustrates a multi-focus superimposed image $SI_{i=2}$ when the other slice images $M_2$ to $M_5$ are shifted by the shift amount $\sigma_2$ with respect to the slice image $M_1$ that is the reference image. FIG. 11D illustrates a multi-focus superimposed image $SI_{i=3}$ when the other slice images $M_2$ to $M_5$ are shifted by the shift amount $\sigma_3$ with respect to the slice image $M_1$.

When the variable i has reached the maximum value n (step S134: Yes), on the other hand, the operation of the control unit 23 returns to the main routine.

The processing of step S12 (refer to FIGS. 3 and 8) subsequent to step S11 is generally similar to the processing in the first embodiment. However, in steps S122 to S124 illustrated in FIG. 8, using the shift amount $\sigma_i$ that is used when the multi-focus superimposed image $SI_i$ is generated, a multi-focus superimposed PSF image is generated for each multi-focus superimposed image $SI_i$ and the multi-focus superimposed image $SI_i$ is restored using these multi-focus superimposed PSF images. As a result, a plurality of all-in-focus images having different shift amounts $\sigma_i$ is acquired from one Z stack image.

Furthermore, in step S13 in FIG. 3, when these all-in-focus images are displayed on the display apparatus 30, the all-in-focus images may be displayed side by side in order of size (ascending order or descending order) of the shift amount $\sigma_i$. These all-in-focus images may be sequentially switched and displayed in the same area. For example, a plurality of all-in-focus images acquired from a plurality of multi-focus superimposed images $SI_i$ illustrated in (a) to FIG. 11D may be repeatedly switched in order of the shift amount of zero→the shift amount $\sigma_1$→the shift amount $\sigma_2$→the shift amount $\sigma_3$→the shift amount $\sigma_2$→the shift amount $\sigma_1$→the shift amount zero→ . . . .

As described above, according to the first modification of the first embodiment of the present disclosure, a plurality of all-in-focus images having different shift amounts $\sigma_i$ with respect to the reference image $M_k$ is acquired and displayed. Therefore, the user may grasp in more details an overlapping state of structures in the Z direction in the object S and an anteroposterior relationship between the structures.

Second Embodiment

Figure 12:
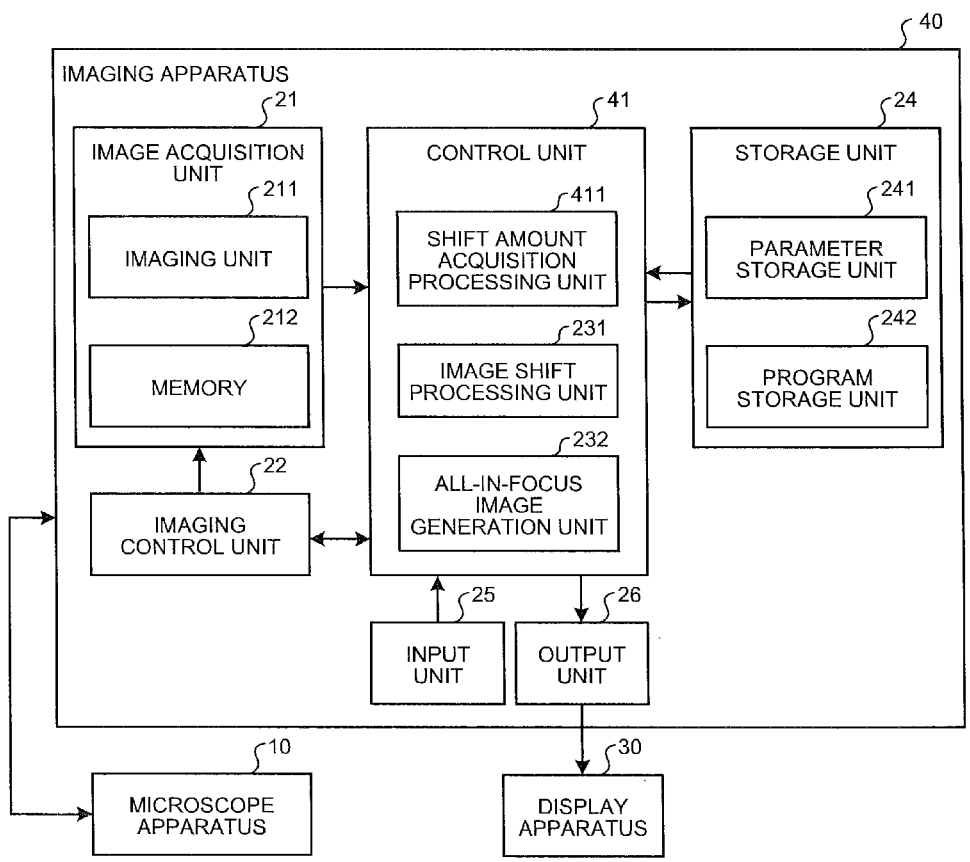
FIG. 12 is a block diagram illustrating an exemplary configuration of a microscopy system according to a second embodiment of the present disclosure.

Next, a second embodiment of the present disclosure will be described. FIG. 12 is a block diagram illustrating an exemplary configuration of a microscopy system according to the second embodiment of the present disclosure. As illustrated in FIG. 12, a microscopy system 2 according to the second embodiment includes a microscope apparatus 10, an imaging apparatus 40 that acquires and processes an image of an enlarged image generated by the microscope apparatus 10, and a display apparatus 30 that displays the image and the like processed by the imaging apparatus 40. Among the components, the configuration and operation of the microscope apparatus 10 and the display apparatus 30 are similar to those in the first embodiment (refer to FIGS. 1 and 2).

The imaging apparatus 40 includes a control unit 41 instead of the control unit 23 illustrated in FIG. 1. The control unit 41 further includes a shift amount acquisition processing unit 411, as compared with the control unit 23. The configuration and operation of each unit of the imaging apparatus 40 other than the control unit 41, and the operations of an image shift processing unit 231 and an all-in-focus image generation unit 232 are similar to those in the first embodiment.

The shift amount acquisition processing unit 411 acquires the shift amount of each of other slice images with respect to a reference image, which are used when a multi-focus superimposed image is generated from a Z stack image. This shift amount is acquired based on a shift parameter stored in advance in a parameter storage unit 241. The shift parameter includes the direction of a virtual viewpoint with respect to an object S and a unit shift amount of the slice image set for each viewpoint.

Figure 13:
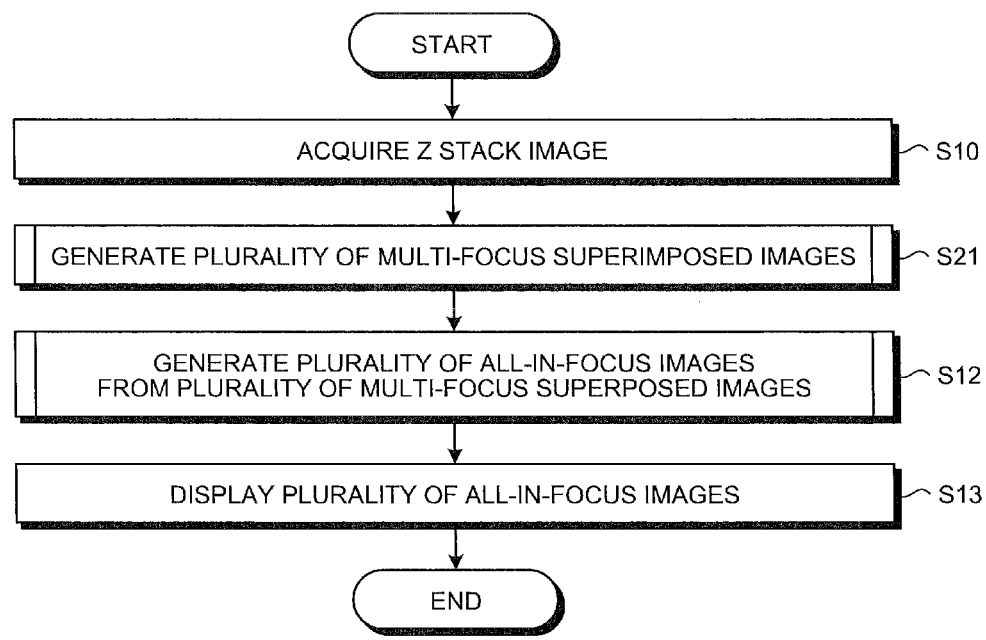
FIG. 13 is a flowchart illustrating an operation of the microscopy system illustrated in FIG. 12.

Next, the operation of the microscopy system 2 will be described. FIG. 13 is a flowchart illustrating the operation of the microscopy system 2. Step S10 illustrated in FIG. 13 is similar to that in the first embodiment (refer to FIG. 3). However, in the second embodiment, a Z stack image including at least three slice images having different focal positions is acquired by performing imaging at least three times. In the following description, as will be described later, processing for a Z stack image including five slice images will be described.

In step S21 subsequent to step S10, the control unit 41 generates a plurality of multi-focus superimposed images in which the shift amounts of the slice images are different from each other.

Figure 14:
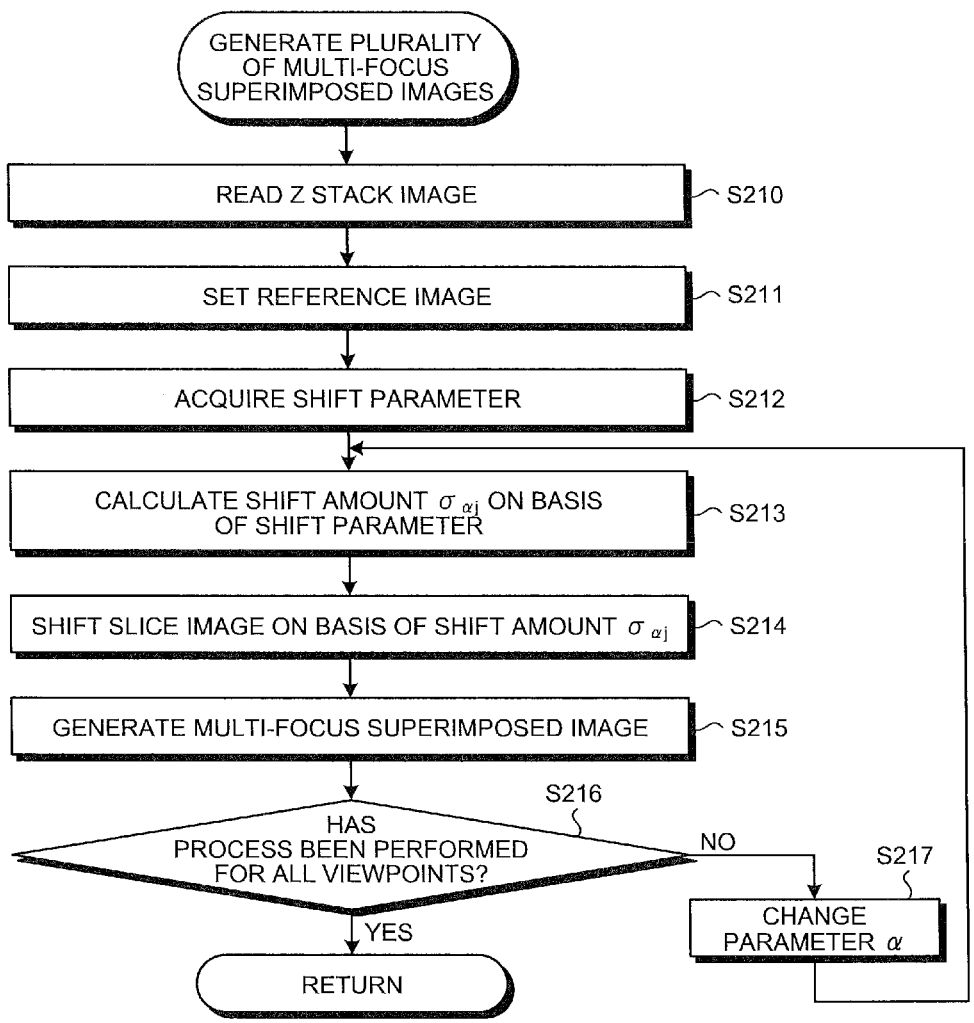
FIG. 14 is a flowchart illustrating details of processing of generating a plurality of multi-focus superimposed images.
Figure 15:
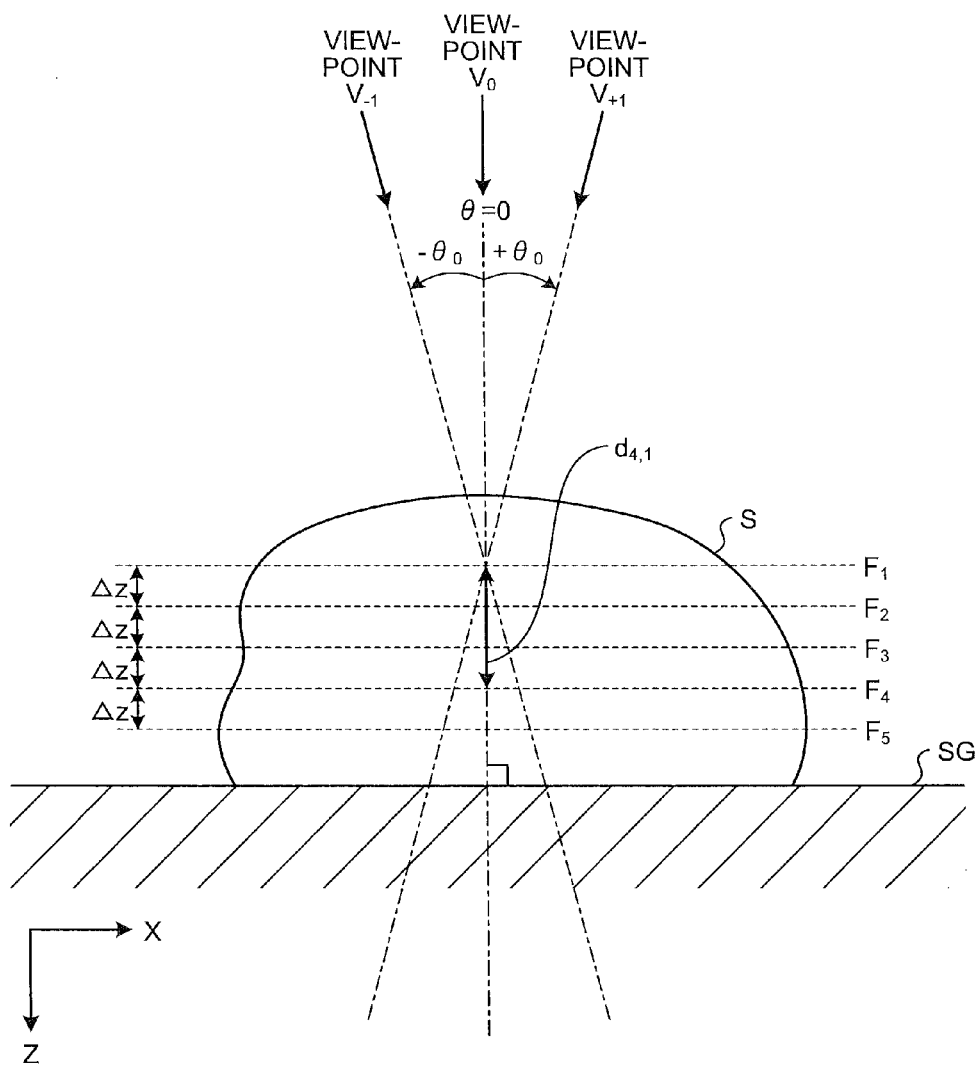
FIG. 15 is a schematic diagram for describing the processing of generating the plurality of multi-focus superimposed images.

FIG. 14 is a flowchart illustrating details of processing of generating a plurality of multi-focus superimposed images. Furthermore, FIGS. 15 and 16 are schematic diagrams for describing the processing of generating a plurality of multi-focus superimposed images.

First, in step S210, the shift amount acquisition processing unit 411 reads the Z stack image from the image acquisition unit 21.

In subsequent step S211, the shift amount acquisition processing unit 411 sets any slice image $M_j$ in the Z stack image as the reference image $M_k$. Specifically, as the reference image $M_k$, any slice image $M_j$ such as a slice image $M_1$ having the shallowest slice position ($Z=F_1$), a slice image $M_5$ having the deepest slice position ($Z=F_5$), or a slice image $M_3$ the slice position of which is near the center ($Z=F_3$) is set in advance. Alternatively, the reference image $M_k$ may be appropriately set according to information input from the input unit 25 in response to a user operation. In the second embodiment, as an example, it is assumed that the slice image $M_1$ is set as the reference image $M_k$.

In subsequent step S212, the shift amount acquisition processing unit 411 acquires the shift parameter from the parameter storage unit 241. In the second embodiment, it is assumed that an all-in-focus image in the case where the object S is observed virtually from the three directions of viewpoints $V_\alpha = V_{-1}, V_0, V_{+1}$ is finally acquired. In this case, as shift parameters, a parameter $\alpha = -1, 0, +1$ indicating the viewpoint $V_\alpha$ and a unit shift amount $\delta$ are acquired. Herein, when the parameter $\alpha$ is zero, this means that the viewpoint $V_\alpha$ is set directly above the object S. When the parameter $\alpha$ is a positive value, this means that the viewpoint $V_\alpha$ is set in the +X direction with respect to directly above the object S. Conversely, when the parameter $\alpha$ is a negative value, this means that the viewpoint $V_\alpha$ is set in the −X direction with respect to directly above the object S.

In subsequent step S213, the shift amount acquisition processing unit 411 calculates a shift amount $\sigma_{\alpha j}$ of each slice image $M_j$ based on the shift parameters acquired in step S212. This shift amount $\sigma_{\alpha j}$ is sequentially calculated for each viewpoint $V_\alpha$. In the following description, it is assumed that the shift amount $\sigma_{\alpha j}$ is calculated in order of $\alpha = -1, 0, +1$. However, the calculation order is not limited thereto. Furthermore, reference sign j representing the slice position of the slice image $M_j$ is j=1, 2, 3, 4, 5 in FIG. 15.

The shift amount $\sigma_{\alpha j}$ is given by the following formula (2) using the unit shift amount $\delta$ (pixel).

$$\sigma_{\alpha j} = -\alpha \times \{\delta \times (j-k)\} \quad (2)$$

Specifically, when the reference image is the slice image $M_1$ (k=1), the viewpoint $V_\alpha = V_{-1}$ ($\alpha = -1$), and the unit shift amount $\delta$ is $\delta = 1$ (pixel), the shift amounts $\sigma_{-11}$ to $\sigma_{-15}$ of the respective slice images $M_j$ are given by the following formulae (3-1) to (3-5).

$$\sigma_{-11} = -(-1) \times \{1 \times (1-1)\} = 0 \text{ (pixel)} \quad (3\text{-}1)$$

$$\sigma_{-12} = -(-1) \times \{1 \times (2-1)\} = +1 \text{ (pixel)} \quad (3\text{-}2)$$

$$\sigma_{-13} = -(-1) \times \{1 \times (3-1)\} = +2 \text{ (pixels)} \quad (3\text{-}3)$$

$$\sigma_{-14} = -(-1) \times \{1 \times (4-1)\} = +3 \text{ (pixels)} \quad (3\text{-}4)$$

$$\sigma_{-15} = -(-1) \times \{1 \times (5-1)\} = +4 \text{ (pixels)} \quad (3\text{-}5)$$

Figure 16A:
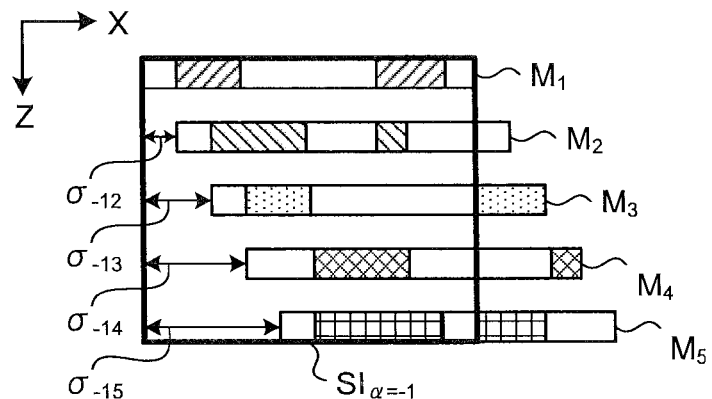
FIGS. 16A-16C are schematic diagrams for describing the processing of generating the plurality of multi-focus superimposed images.

In subsequent step S214, the image shift processing unit 231 shifts the slice image $M_j$ based on the shift amount $\sigma_{\alpha j}$ calculated in step S213. Herein, when the reference sign of the shift amount $\sigma_{\alpha j}$ is positive, the slice image $M_j$ is shifted in the +X direction. When the reference sign of the shift amount $\sigma_{\alpha j}$ is negative, the slice image $M_j$ is shifted in the −X direction. Furthermore, when the shift amount $\sigma_{\alpha j}$ is zero, the slice image $M_j$ is not shifted. FIG. 16A illustrates a state in which the other slice images $M_2$ to $M_5$ are shifted by the shift amounts $\sigma_{-12}, \sigma_{-13}, \sigma_{-14}$, and $\sigma_{-15}$, respectively, with respect to the slice image $M_1$ as the reference image.

In subsequent step S215, the all-in-focus image generation unit 232 generates a multi-focus superimposed image $SI_\alpha$ from the Z stack image after the shift processing of the slice image $M_j$. That is, by averaging the pixel values of pixels the positions of which correspond to each other between the reference image $M_k$ and the slice image $M_j$ after the shift processing, the pixel value of each pixel in the multi-focus superimposed image $SI_\alpha$ (in the case of FIG. 16A, $SI_{\alpha=-1}$) is calculated.

In subsequent step S216, the control unit 41 determines whether processing has been performed for all viewpoints based on the shift parameters acquired in step S212. In the case where there is a viewpoint yet to be processed (step S216: No), the shift amount acquisition processing unit 411 changes the parameter $\alpha$ (step S217), and repeats the processing in steps S213 to S216 based on the changed parameter $\alpha$.

Figure 16B:
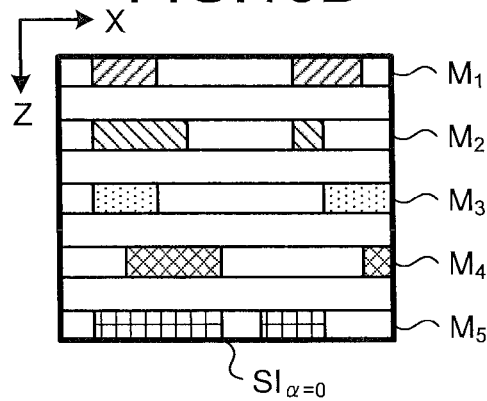

FIG. 16B is a schematic diagram illustrating a multi-focus superimposed image $SI_{\alpha=0}$ generated in the case of the viewpoint $V_\alpha = V_0$ ($\alpha = 0$). In the case of $\alpha = 0$, the shift amounts $\sigma_{02}$ to $\sigma_{05}$ of the slice images $M_2$ to $M_5$ are all zero.

Figure 16C:
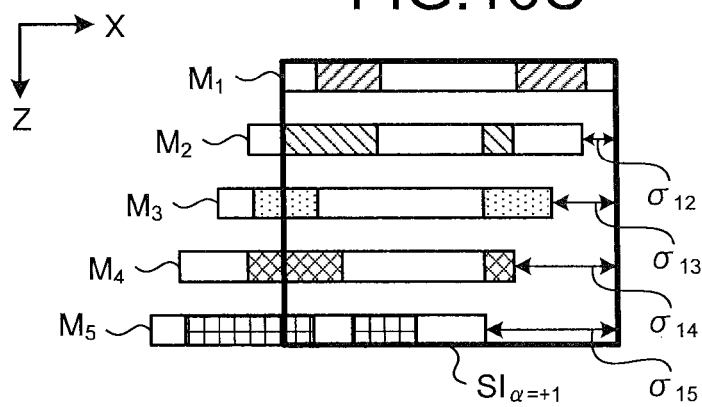

FIG. 16C is a schematic diagram illustrating a multi-focus superimposed image $SI_{\alpha=-1}$ generated in the case of viewpoint $V_\alpha = V_{+1}$. In the case of $\alpha = +1$, since the shift amounts $\sigma_{+12}, \sigma_{+13}, \sigma_{+14}$, and $\sigma_{+15}$ are negative values, the slice images $M_2$ to $M_5$ are shifted in the −X direction.

On the other hand, if the processing has been performed for all viewpoints (step S216: Yes), the operation of the control unit 41 returns to the main routine.

The processing in step S12 subsequent to step S21 (refer to FIGS. 13 and 8) is generally similar to that in the first embodiment. However, in steps S122 to S124 among the steps, a multi-focus superimposed PSF images is generated for each multi-focus superimposed image $SI_\alpha$, using the shift amount $\sigma_{\alpha j}$ of each slice image $M_j$ that is used when the multi-focus superimposed image $SI_\alpha$ is generated. Then, the multi-focus superimposed image $SI_\alpha$ is restored, using these multi-focus superimposed PSF images. As a result, a plurality of all-in-focus images having different shift amounts $\sigma_{\alpha j}$ is acquired from one Z stack image.

Furthermore, when these all-in-focus images are displayed on the display apparatus 30 in step S13, the all-in-focus images having different viewpoints $V_\alpha$ may be displayed in order of $\alpha = -1, 0, +1$. These all-in-focus images may be sequentially switched and displayed in the same area. In the latter case, by repeatedly switching the all-in-focus images, for example, in the order of $\alpha = -1, 0, +1, 0, -1, \ldots$, the user may observe the all-in-focus images while feeling as if to sequentially shift their viewpoint for the object S left and right As described above, according to the second embodiment of the present disclosure, it is possible to reproduce a state in which the object S is virtually observed from a plurality of directions, using the plurality of all-in-focus images having different shift amounts. Therefore, the user may further intuitively grasp a position of a structure in the Z direction in the object S, an overlapping state of structures and an anteroposterior relationship between the structures.

Second Modification 1

Next, second modification 1 of the second embodiment of the present disclosure will be described. In the second embodiment, the shift amount $\sigma_{\alpha j}$ of each slice image $M_j$ is calculated for each viewpoint $V_\alpha$, using the unit shift amount δ. However, the shift amount $\sigma_{\alpha j}$ may be calculated using θ representing the direction of each viewpoint $V_\alpha$ (θ=−θ$_0$, 0, +θ$_0$).

In this case, the shift amount $\sigma_{\alpha j}$ of the slice image $M_j$ set for each viewpoint $V_\alpha$ is given by the following formula (4), using a distance $d_{j,k}$=Δz×(j−k) between the slice position $F_k$ of the reference image $M_k$ and the slice position $F_j$ of the slice image $M_j$, an angle $\theta_\alpha$, and a pixel pitch p (μm/pixel) of an imaging element provided to an imaging unit 211.

$$\sigma_{\alpha j} = -(d_{j,k} \cdot \tan \theta_\alpha)/p \qquad (4)$$

Note that in FIG. 15, the distance $d_{4,1}$ between the slice position $F_1$ and the slice position $F_4$ is illustrated.

Second Modification 2

Next, second modification 2 of the present disclosure will be described. The configuration and operation of a microscopy system according to second modification 2 are generally similar to those in the second embodiment (refer to FIGS. 12 and 13). Description will be given with respect to a case of further increasing the viewpoint $V_\alpha$ when executing the processing of calculating the shift amount $\sigma_{\alpha j}$ in step S213 illustrated in FIG. 14 in the processing of generating a plurality of multi-focus superimposed images in Step S21. FIGS. 17 and 18A-18D are schematic diagrams for describing processing of calculating the shift amount $\sigma_{\alpha j}$ of the slice image in second modification 2.

Figure 17:
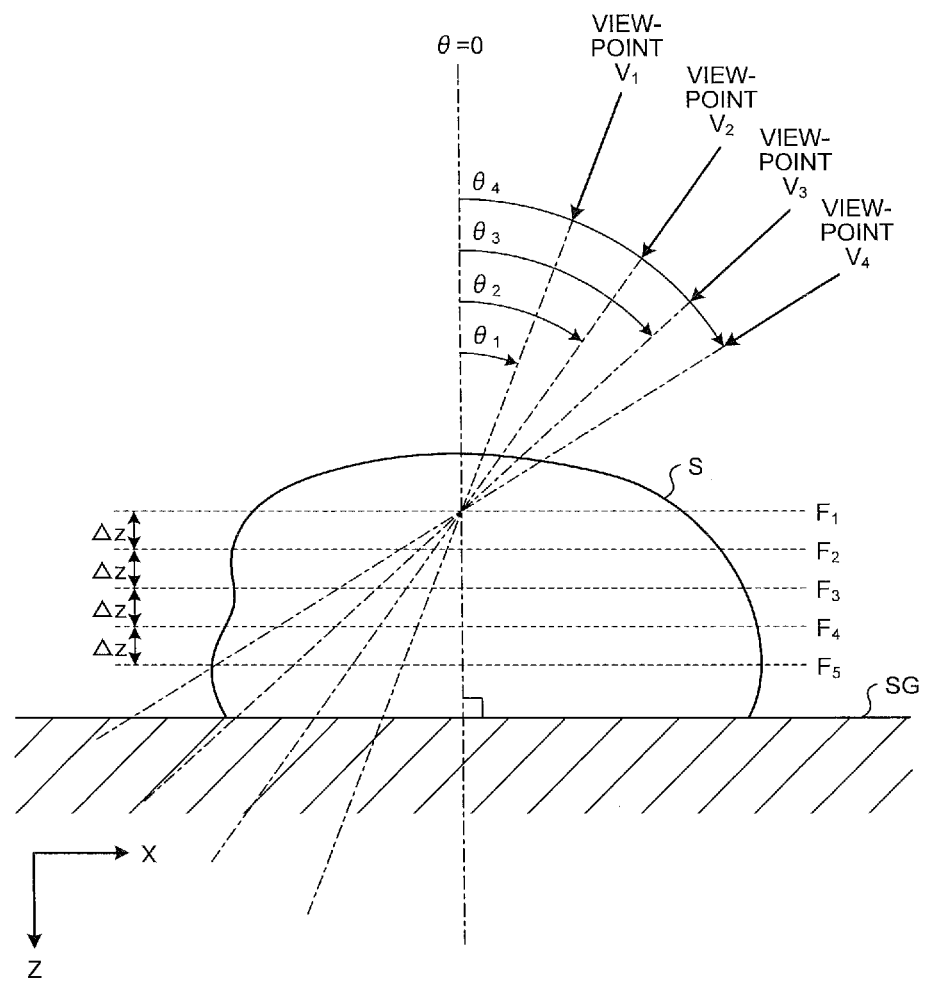
FIG. 17 is a schematic diagram for describing processing of calculating a shift amount of a slice image in second modification 2 of the second embodiment of the present disclosure.
Figure 18A:
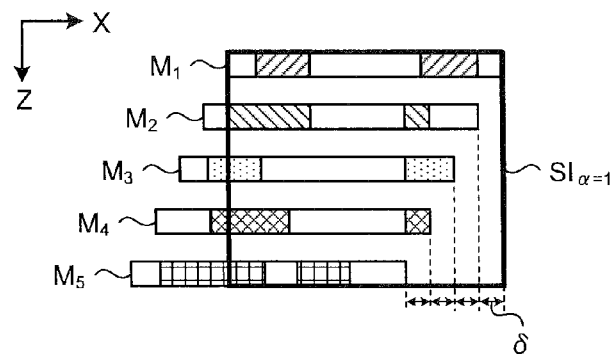
FIGS. 18A-18D are schematic diagrams for describing the processing of calculating a shift amount of a slice image in second modification 2 of the second embodiment of the present disclosure.
Figure 18B:
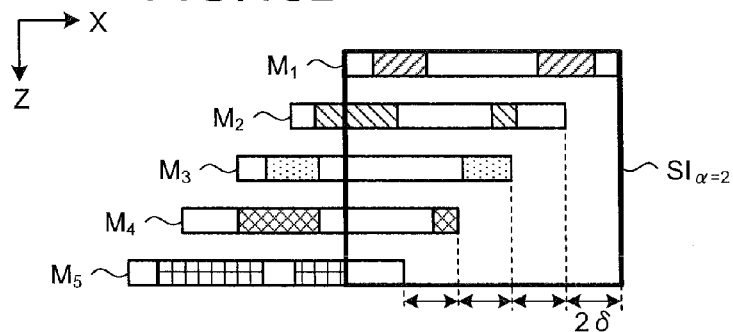
Figure 18C:
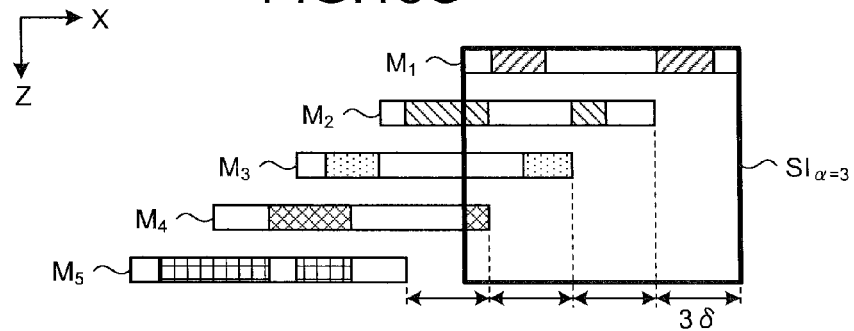
Figure 18D:
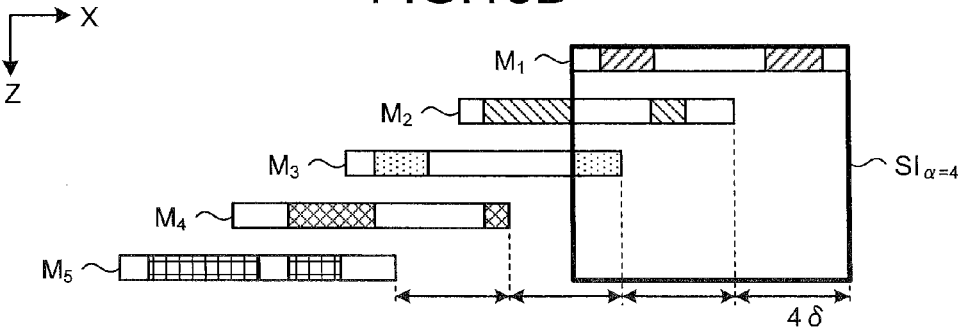

In second modification 2, as illustrated in FIG. 17, the virtual viewpoint $V_\alpha$ (α=1, 2, ...) is set so as to form a plurality of angles (θ$_\alpha$=θ$_1$, θ$_2$, ...) in one direction with respect to the direction directly above the object S, that is, θ$_\alpha$=0. Also in this case, the shift amount $\sigma_{\alpha j}$ is given by formula (2) as in the second embodiment.

$$\sigma_{\alpha j} = -\alpha \times \{\delta \times (j-k)\} \qquad (2)$$

That is, the shift amount $\sigma_{\alpha j}$ of each slice image $M_j$ when the multi-focus superimposed image $SI_\alpha$ is generated increases as the angle θ of the virtual viewpoint $V_\alpha$ increases. Specifically, as illustrated in FIGS. 18A-18D, the shift amount between the slice images $M_j$ the slice positions (stack order j) of which are adjacent is δ for the multi-focus superimposed image $SI_{\alpha=1}$, 2δ for the multi-focus superimposed image $SI_{\alpha=2}$, 3δ for the multi-focus superimposed image $SI_{\alpha=3}$, and 4δ for the multi-focus superimposed image $SI_{\alpha=4}$.

In this way, by changing the shift amount between slice images the slice positions (stack order j) of which are adjacent, among a plurality of multi-focus superimposed images $SI_\alpha$, it is possible to more realistically reproduce a state in which the object S is virtually observed from a plurality of directions at different angles. Therefore, the user may intuitively grasp a position of a structure in the Z direction in the object S, an overlapping state of structures and an anteroposterior relationship between the structures in a wider range.

Note that in second modification 2, the viewpoints $V_1$, $V_2$, ... are changed in one direction (right direction in FIG. 17) with respect to the direction directly above the object S. However, the viewpoints $V_1$, $V_2$, ... may be each changed rightward and leftward with respect to the direction directly above the object S.

Furthermore, also in second modification 2, a shift amount $\sigma_{\alpha j}$ may be calculated by the above-described formula (4), using the angle $\theta_\alpha$ in the direction of the viewpoint $V_\alpha$.

Second Modification 3

Next, second modification 3 of the second embodiment will be described. In the second embodiment, the shift amount of each slice image $M_j$ is determined according to the shift parameters stored in the parameter storage unit 241 in advance. However, this shift amount may be determined according to a user operation.

In this case, first, a control unit 41 generates a plurality of all-in-focus images based on shift parameters stored in advance in a parameter storage unit 241, and causes a display apparatus 30 to display the plurality of all-in-focus images. Then, this display apparatus 30 displays an input field that allows the user to input a viewpoint $V_\alpha$.

Figure 19:
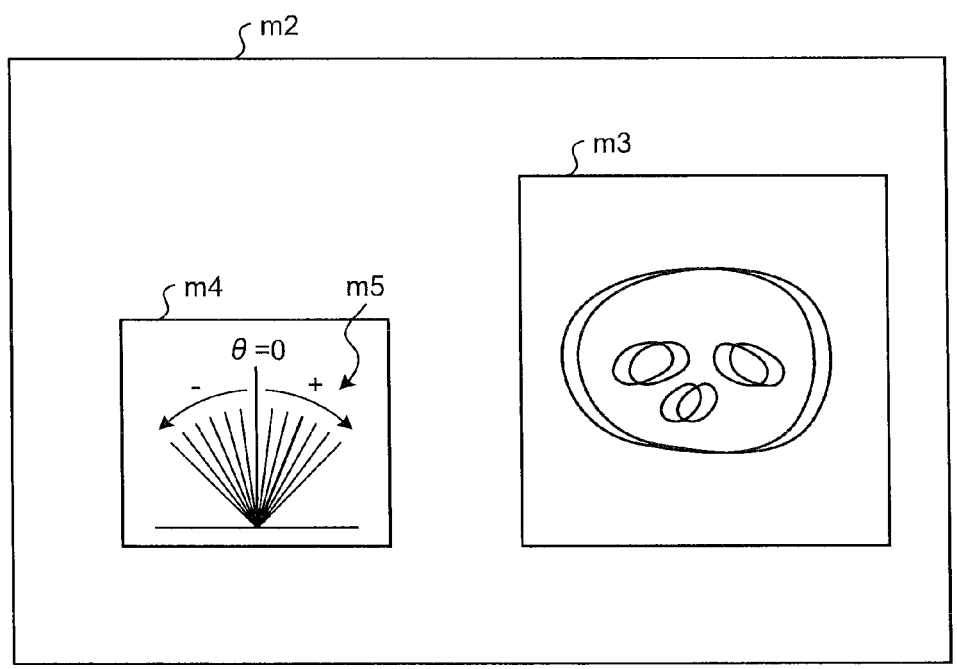
FIG. 19 is a schematic diagram illustrating an example of a screen displayed on a display apparatus in second modification 3 of the second embodiment of the present disclosure.

FIG. 19 is a schematic diagram illustrating an example of a screen displayed on the display apparatus 30. This screen m2 includes an all-in-focus image display area m3 in which a plurality of all-in-focus images is switched and displayed, and a viewpoint input field m4 that allows the user to input the viewpoint $V_\alpha$. A scale m5 indicating an angle θ of the viewpoint $V_\alpha$ is displayed in the viewpoint input field m4. When the user's desired angle $\theta_\alpha$ is selected by a pointer operation using an input unit 25 with respect to the scale m5, a signal representing the angle $\theta_\alpha$ is input to the control unit 41. In response to this, the control unit 41 calculates the shift amount $\sigma_{\alpha j}$ according to the angle $\theta_\alpha$, thereby generating an all-in-focus image. Then, the control unit 41 causes the display apparatus 30 to display the all-in-focus image.

According to second modification 3, it is possible to reproduce a state of observing an object S from a viewpoint desired by the user. Therefore, it is possible to adjust a position of a structure in the Z direction in the object S, an overlapping state of structures and an anteroposterior relationship between the structures such that the user may easily see.

Third Embodiment

Figure 20:
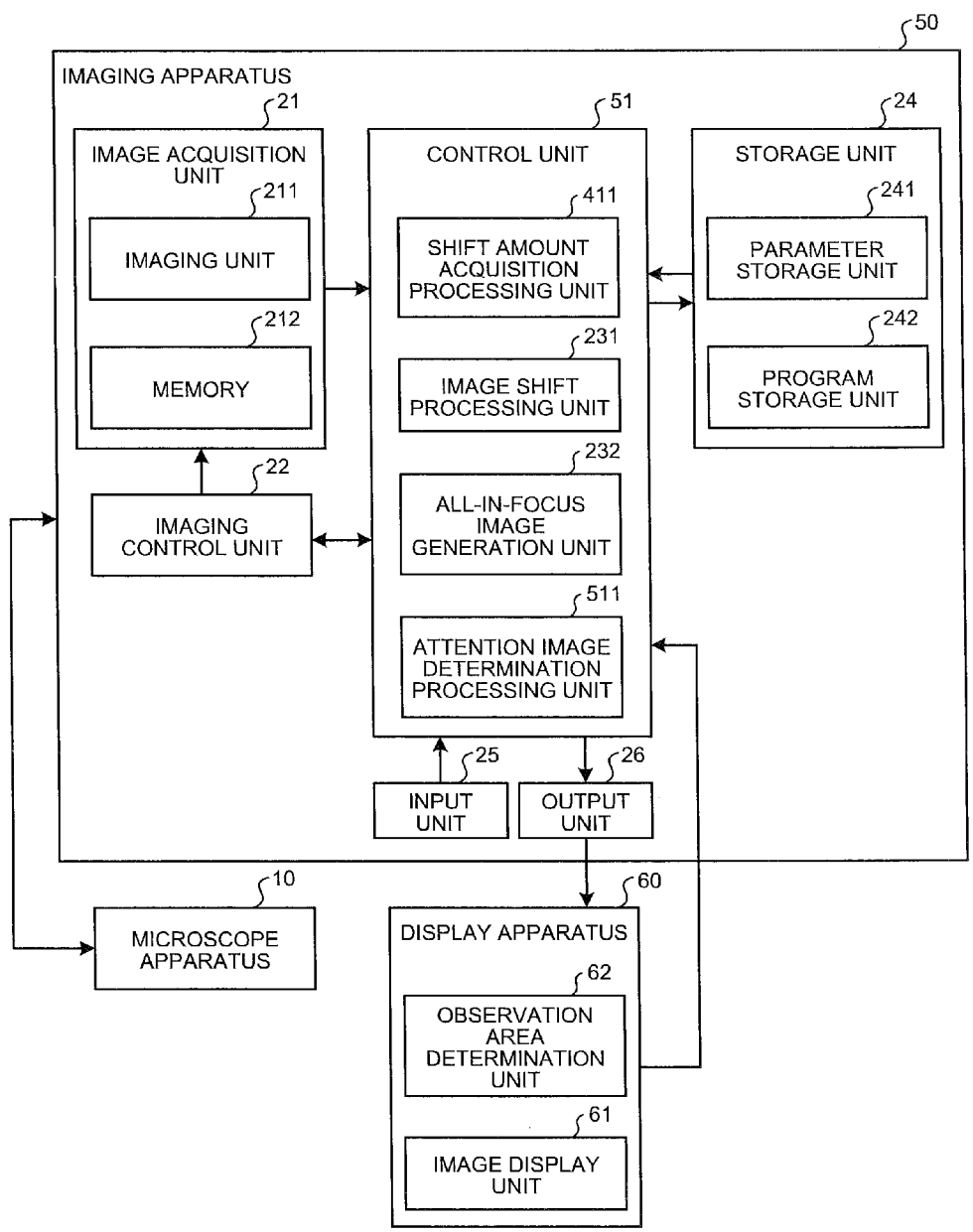
FIG. 20 is a block diagram illustrating an exemplary configuration of a microscopy system according to a third embodiment of the present disclosure.

Next, a third embodiment of the present disclosure will be described. FIG. 20 is a block diagram illustrating an exemplary configuration of a microscopy system according to a third embodiment of the present disclosure. As illustrated in FIG. 20, a microscopy system 3 according to the third embodiment includes a microscope apparatus 10, an imaging apparatus 50 that acquires and processes an image of an enlarged image generated by the microscope apparatus 10, and a display apparatus 60 that displays the image and the like processed by the imaging apparatus 50. Among the components, the configuration and operation of the microscope apparatus 10 are similar to those in the first embodiment (refer to FIG. 2).

The imaging apparatus 50 includes a control unit 51 instead of the control unit 23 illustrated in FIG. 1. The control unit 51 further includes a shift amount acquisition processing unit 411 and an attention image determination processing unit 511, as compared with the control unit 23. Among the components, the operation of the shift amount acquisition processing unit 411 is similar to that in the second embodiment.

The attention image determination processing unit 511 determines, as an attention image, a slice image including an observation area that is input from the display apparatus 60 described later via an input unit 25.

The display apparatus 60 includes, for example, an LCD, an EL display or a CRT display, and includes an image display unit 61 that displays an image output from an output unit 26 and related information and an observation area determination unit 62 that determines, as an observation area, an area in an all-in-focus image displayed in the image display unit 61, according to an operation performed from the outside and inputs a signal representing the observation area to the control unit 51.

Next, the operation of the microscopy system 3 will be described. FIG. 21 is a flowchart illustrating the operation of the microscopy system 3. Note that operations in steps S10, S21, S12, and S13 are similar to those in the second embodiment. FIGS. 22A-22D are schematic diagrams illustrating a state in which the slice images $M_2$ to $M_5$ are shifted with a slice image $M_1$ as a reference image when multi-focus superimposed images $SI_{\alpha=1}$, $SI_{\alpha=2}$, $SI_{\alpha=3}$, and $SI_{\alpha=4}$ are generated in step S21. Multi-focus superimposed images are generated by superimposing these images $M_1$ to $M_5$ and further restored by using PSF images, whereby a plurality of all-in-focus images $AI_{\alpha=1}$, $AI_{\alpha=2}$, $AI_{\alpha=3}$, and $AI_{\alpha=4}$ is generated. In the third embodiment, it is assumed that the all-in-focus images $AI_{\alpha=1}$, $AI_{\alpha=2}$, $AI_{\alpha=3}$, and $AI_{\alpha=4}$ generated in this way are sequentially switched and displayed on the image display unit 61.

In step S31 subsequent to step S13, the observation area determination unit 62 determines whether a user operation of selecting any area for any of the all-in-focus images $AI_{\alpha=1}$, $AI_{\alpha=2}$, $AI_{\alpha=3}$, and $AI_{\alpha=4}$ displayed on the image display unit 61 has been performed.

When the user operation has not been performed (step S31: No), the operation of the microscopy system 3 returns to step S13.

Figure 23:
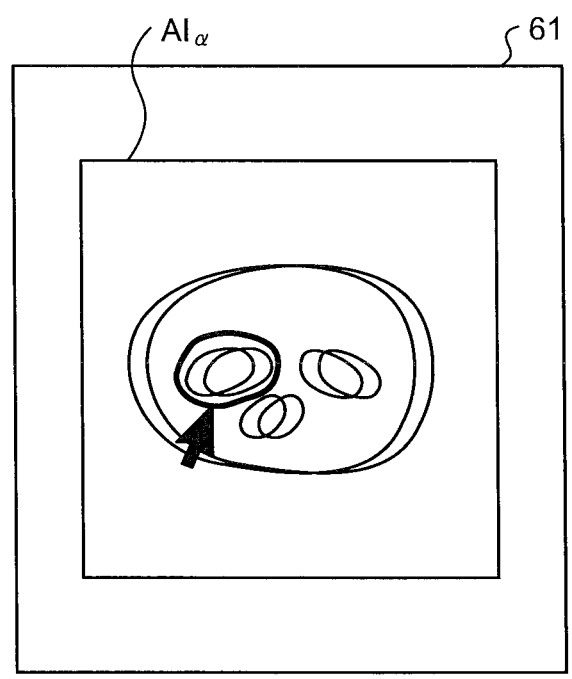
FIG. 23 is a schematic diagram illustrating an exemplary method of selecting an observation area.

When the user operation has been performed (step S31: Yes), on the other hand, the observation area determination unit 62 determines the area selected by the user operation as an observation area, and inputs a signal representing the observation area to the control unit 51 (step S32). FIG. 23 is a schematic diagram illustrating an exemplary method of selecting an observation area. As illustrated in FIG. 23, for example, an observation area is selected by surrounding a desired area in an all-in-focus image displayed on the image display unit 61 by a pointer operation using a mouse or the like.

Figure 24:
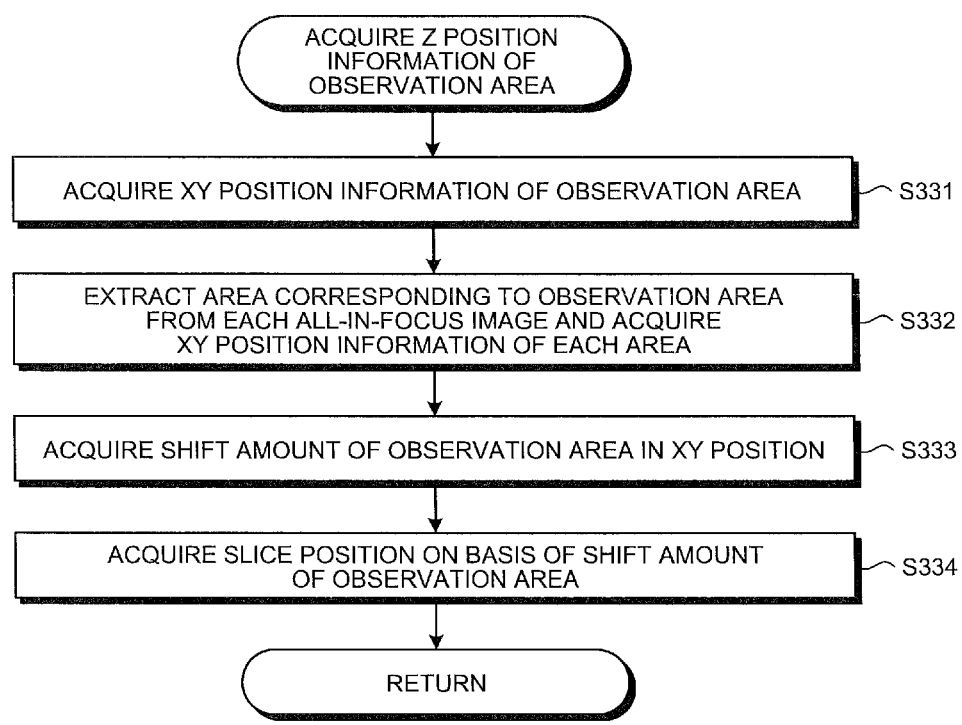
FIG. 24 is a flowchart illustrating details of processing of acquiring Z position information of the observation area.

In subsequent step S33, the control unit 51 acquires the Z position information of the observation area based on information representing the observation area that is input from the observation area determination unit 62. FIG. 24 is a flowchart illustrating details of processing of acquiring the Z position information of the observation area. In the following description, as an example, a case where the area $A_{\alpha=3}$ within the all-in-focus image $AI_{\alpha=3}$ illustrated in FIGS. 22A-22D is determined as an observation area will be described.

In step S331, the attention image determination processing unit 511 acquires the XY position information of an observation area $A_{\alpha=3}$ in an all-in-focus image $AI_{\alpha=3}$.

In subsequent step S332, the attention image determination processing unit 511 extracts areas $A'_{\alpha=1}$, $A'_{\alpha=2}$, and $A'_{\alpha=4}$ corresponding to the observation area $A_{\alpha=3}$, from all-in-focus images $AI_{\alpha=1}$, $AI_{\alpha=2}$, and $AI_{\alpha=4}$ other than the all-in-focus image $AI_{\alpha=3}$, and acquires the XY position information of each area. The areas $A'_{\alpha=1}$, $A'_{\alpha=2}$, and $A'_{\alpha=4}$ may be extracted, using a known image recognition technique such as pattern matching. Hereinafter, these areas $A'_{\alpha=1}$, $A'_{\alpha=2}$, $A'_{\alpha=4}$ are also referred to as observation areas.

In subsequent step S333, the attention image determination processing unit 511 acquires the shift amounts of the observation areas $A'_{\alpha=1}$, $A'_{\alpha=2}$, $A_{\alpha=3}$, and $A'_{\alpha=4}$ in the XY position between the all-in-focus images $AI_{\alpha=1}$, $AI_{\alpha=2}$, $AI_{\alpha=3}$, and $AI_{\alpha=4}$. In the cases of FIGS. 22A-22D, there are acquired a shift amount between the X position of the observation area $A'_{\alpha=1}$ in the all-in-focus image $AI_{\alpha=1}$ and the position of the observation area $A'_{\alpha=2}$ in the all-in-focus image $AI_{\alpha=2}$, a shift amount between the X position of the observation area $A'_{\alpha=2}$ in the all-in-focus image $AI_{\alpha=2}$ and the position of the observation area $A_{\alpha=3}$ in the all-in-focus image $AI_{\alpha=3}$, and a shift amount between the X position of the observation area $A_{\alpha=3}$ in the all-in-focus image $AI_{\alpha=3}$ and the position of the observation area $A'_{\alpha=4}$ in the all-in-focus image $AI_{\alpha=4}$.

In subsequent step S334, based on the shift amounts of the observation areas $A'_{\alpha=1}$, $A'_{\alpha=2}$, $A_{\alpha=3}$, and $A'_{\alpha=4}$, the attention image determination processing unit 511 acquires a slice position $F_j$ including these observation areas $A'_{\alpha=1}$, $A'_{\alpha=2}$, $A_{\alpha=3}$, and $A'_{\alpha=4}$.

Herein, a shift amount $\sigma_{\alpha j}$ of each slice image $M_j$ in the all-in-focus image $AI_\alpha$ is given by the following formula (6) as described in the second embodiment. Therefore, if a shift amount $|\sigma_{\alpha j}-\sigma_{(\alpha+1)j}|$ between the observation areas $A'_{\alpha=1}$, $A'_{\alpha=2}$, $A_{\alpha=3}$ and $A'_{\alpha=4}$ is given, it is possible to calculate a slice position $F_i$ of the observation area $A'_{\alpha=1}$, $A'_{\alpha=2}$, $A_{\alpha=3}$, and $A'_{\alpha=4}$ according to the following formula (7).

$$\sigma_{\alpha j}=-\alpha\times\{\delta\times(j-k)\} \tag{6}$$

$$|\sigma_{\alpha j}-\sigma_{(\alpha+1)j}|=|\{\alpha-(\alpha+1)\}\times\{\delta\times(j-k)\}|$$

$$|\sigma_{\alpha j}-\sigma_{(\alpha+1)j}|=|\delta\times(j-k)| \tag{7}$$

Figure 22A:
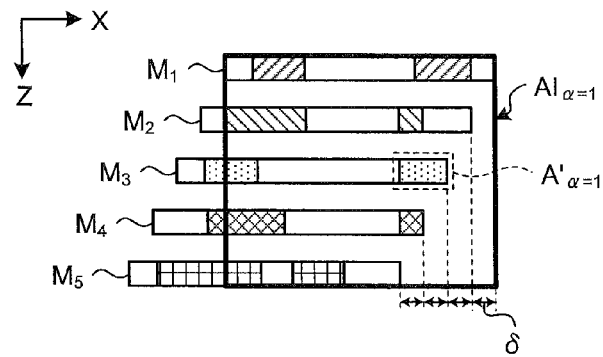
FIGS. 22A-22D are schematic diagrams illustrating a slice image shifted with respect to a reference image.
Figure 22B:
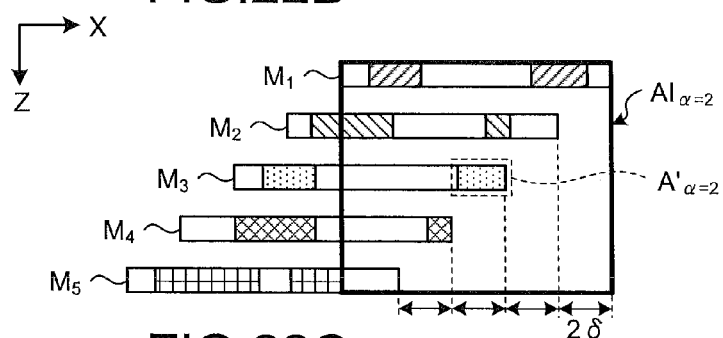
Figure 22C:
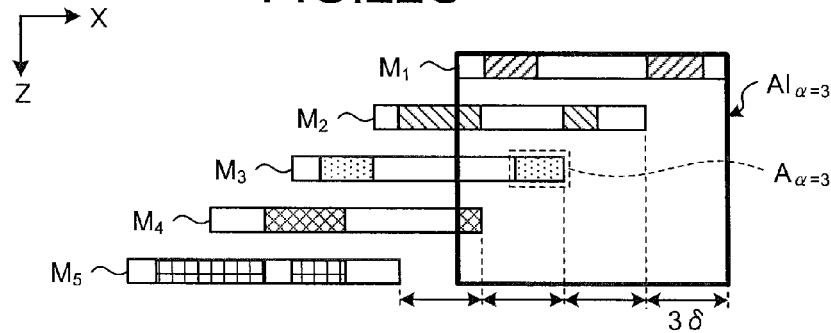
Figure 22D:
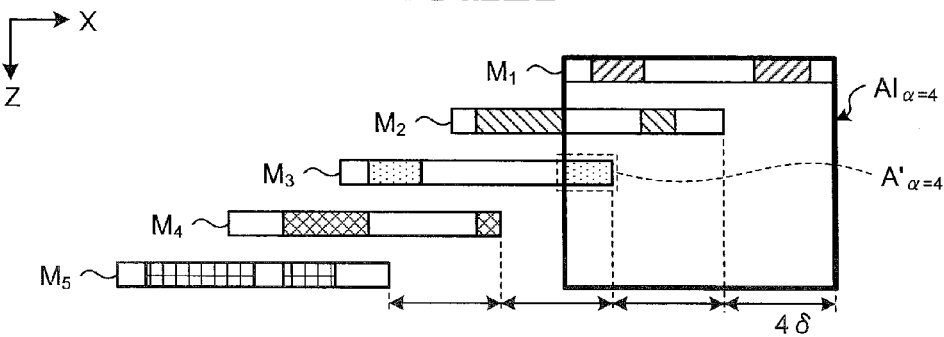

For example, as illustrated in FIGS. 22C and 22D, when the reference image is the slice image $M_1$ (k=1), and the shift amount between the observation area $A_{\alpha=3}$ and the observation area $A'_{\alpha=4}$ is $8\delta-6\delta=2\delta$, j=3 is obtained from formula (7). That is, it may be seen that the observation area $A_{\alpha=3}$ is included in the slice image $M_3$ that is at the third slice position $F_1$.

The attention image determination processing unit 511 outputs the slice position $F_j$ acquired in this way as the Z position information of the observation area. Thereafter, the operation of the control unit 51 returns to the main routine.

In step S34 subsequent to step S33, the control unit 51 extracts the slice image $M_j$ including the observation area based on the Z position information output from the attention image determination processing unit 511 and outputs the extracted slice image $M_j$. In response to this, the display apparatus 60 displays the slice image $M_j$ including the observation area. Note that at this moment, it is also possible to display, along with the slice image $M_j$ including the observation area, other slice images the slice positions of which are adjacent to (that is, preceding and succeeding) the slice image $M_j$. Thereafter, the operation of the microscopy system 3 ends.

According to the third embodiment of the present disclosure described above, it is possible for the user to intuitively easily grasp Z-directional positions of structures that appear to overlap each other on a plane and an anteroposterior relationship between the structures.

Fourth Embodiment

Figure 25:
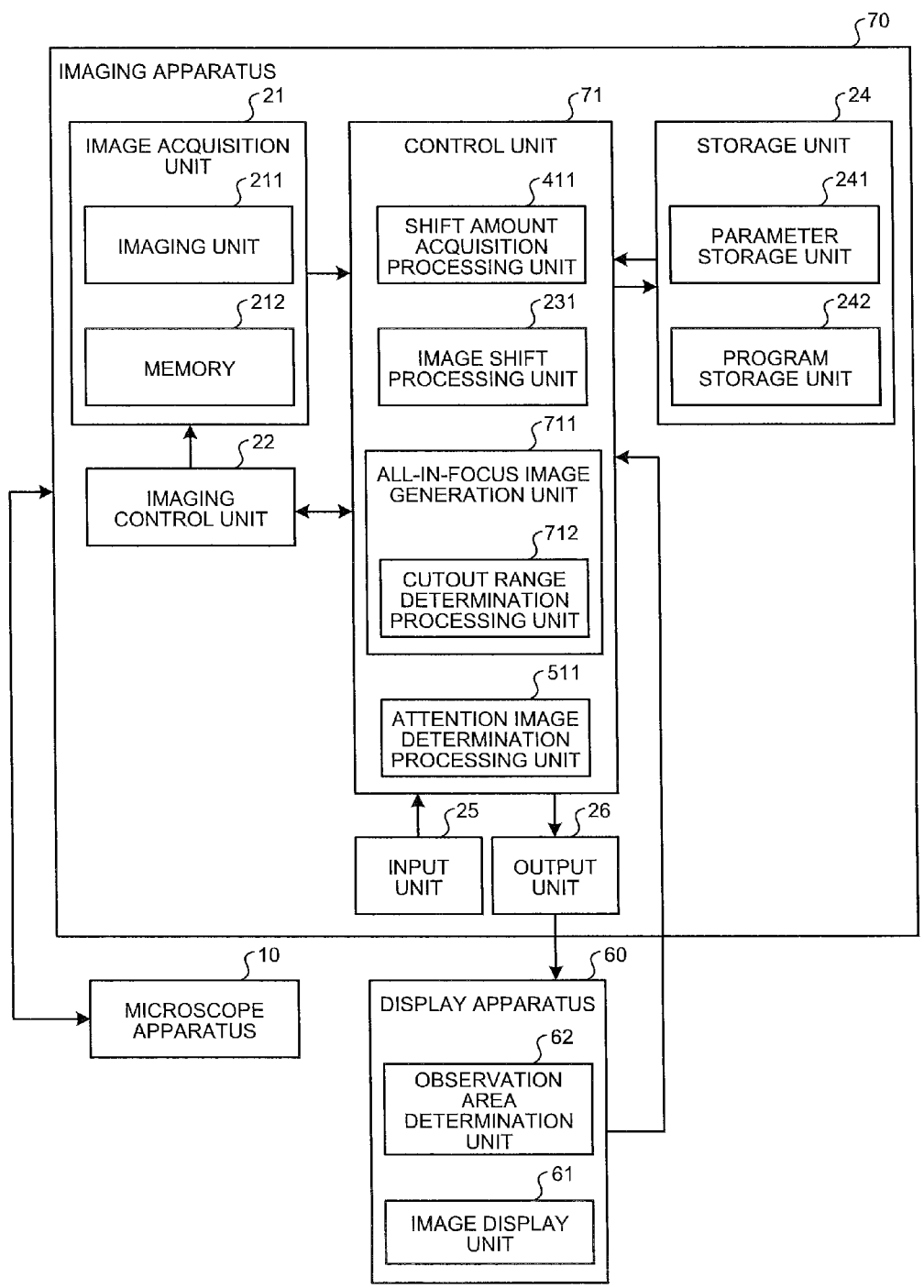
FIG. 25 is a block diagram illustrating an exemplary configuration of a microscopy system according to a fourth embodiment of the present disclosure.
Figure 27A:
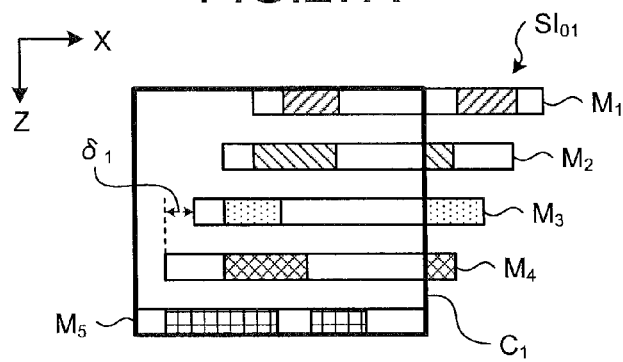
FIGS. 27A-27D are schematic diagrams for describing an operation of the microscopy system illustrated in FIG. 25.
Figure 27B:
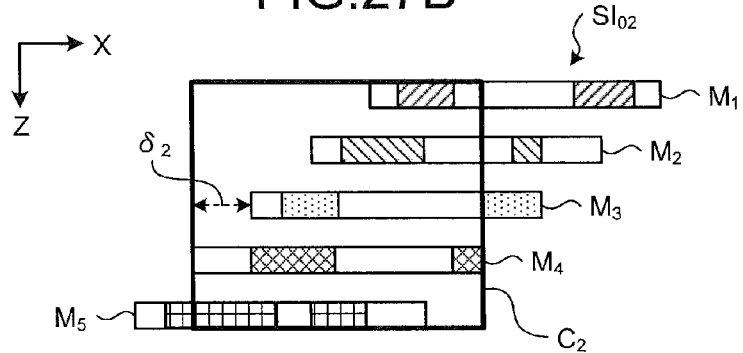
Figure 27C:
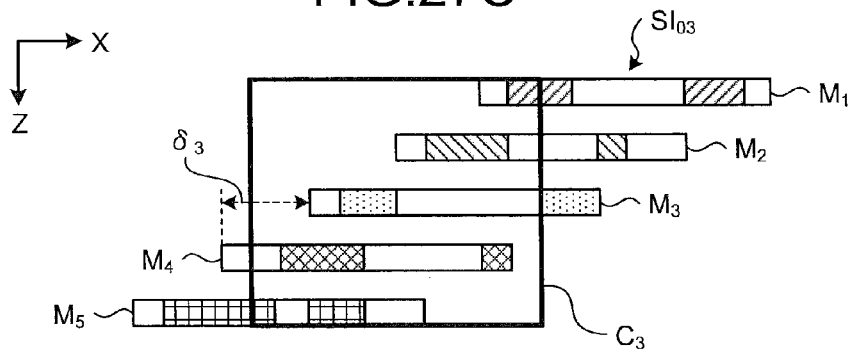
Figure 27D:
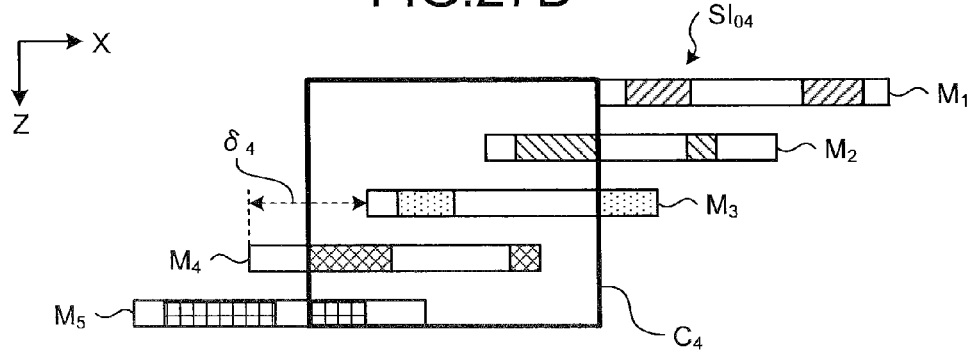

Next, a fourth embodiment of the present disclosure will be described. FIG. 25 is a block diagram illustrating an exemplary configuration of a microscopy system according to the fourth embodiment of the present disclosure. As illustrated in FIG. 25, a microscopy system 4 according to the fourth embodiment includes a microscope apparatus 10, an imaging apparatus 70 that acquires and processes an image of an enlarged image generated by the microscope apparatus 10, and a display apparatus 60 that displays the image and the like processed by the imaging apparatus 70. Among the components, the configuration and operation of the microscope apparatus 10 are similar to those in the first embodiment (refer to FIG. 2). Furthermore, the configuration and operation of the display apparatus 60 are similar to those in the third embodiment (refer to FIG. 20).

The imaging apparatus 70 includes a control unit 71 instead of the control unit 51 illustrated in FIG. 20. The control unit 71 includes an all-in-focus image generation unit 711 instead of the all-in-focus image generation unit 232, as compared with the control unit 51. The configuration and operation of each unit in the imaging apparatus 70 other than the control unit 71 and the configuration and operation of each unit in the control unit 71 other than the all-in-focus image generation unit 711 are similar to those in the third embodiment.

The all-in-focus image generation unit 711 includes a cutout range determination processing unit 712 that cuts out a range of a multi-focus superimposed image used to generate an all-in-focus image. The all-in-focus image generation unit 711 generates an all-in-focus image with respect to the range cut out by the cutout range determination processing unit 712.

Next, the operation of the microscopy system 4 will be described. FIG. 26 is a flowchart illustrating the operation of the microscopy system 4. Note that steps S10 to S34 are similar to those in the third embodiment (refer to FIG. 21). Furthermore, FIGS. 27A-27D are schematic diagrams for describing the operation of the microscopy system 4. In the following description, it is assumed that the observation area determined in step S32 is found to be included in the slice image $M_3$ (refer to step S33).

In step S41 subsequent to step S34, a shift amount acquisition processing unit 411 sets the slice image $M_3$ including the observation area determined in step S32 to a new reference image.

In subsequent step S42, the shift amount acquisition processing unit 411 acquires the shift amount of another slice image $M_j$ with respect to the new reference image used when a multi-focus superimposed image is generated from an original Z stack image. This method of determining the shift amount may be calculated, using formula (2) as in the second embodiment. FIGS. 27A-27D illustrate a case where the shift amounts of other slice images $M_j$ with respect to the slice image $M_3$ that is the reference image are individually set to $\delta_1$, $\delta_2$, $\delta_3$, and $\delta_4$. Note that the shift amount between the slice images $M_j$ in each multi-focus superimposed image is the same.

In subsequent step S43, the image shift processing unit 231 shifts another slice image $M_j$ with respect to the new reference image based on shift amounts $\delta_1$, $\delta_2$, $\delta_3$, and $\delta_4$ acquired in step S42, and the all-in-focus image generation unit 711 regenerates a plurality of multi-focus superimposed images $SI_{O1}$, $SI_{O2}$, $SI_{O3}$, and $SI_{O4}$ from the reference image and another slice image $M_j$ after this shift processing. The method of generating the multi-focus superimposed images is similar to that of the second embodiment.

In subsequent step S44, the cutout range determination processing unit 712 determines a range to be cut out from the multi-focus superimposed images $SI_{O1}$, $SI_{O2}$, $SI_{O3}$, and $SI_{O4}$ such that the XY position of the observation area determined in step S32 does not change with respect to the multi-focus superimposed images $SI_{O1}$, $SI_{O2}$, $SI_{O3}$, and $SI_{O4}$ regenerated in step S43. As a result, the cutout ranges $C_1$ to $C_4$ illustrated in FIGS. 27A-27D are set. The cutout ranges $C_1$ to $C_4$ are set so that the X position of the slice image $M_3$ is constant.

In subsequent step S45, the all-in-focus image generation unit 711 cuts out the multi-focus superimposed images $SI_{O1}$, $SI_{O2}$, $SI_{O3}$, and $SI_{O4}$ in the cutout ranges determined in step S44 and executes restoration processing for the cutout ranges, thereby generating an all-in-focus image.

In subsequent step S46, the imaging apparatus 70 causes the display apparatus 60 to display the plurality of all-in-focus images generated in step S45. Thereafter, the operation of the microscopy system 4 ends.

According to the fourth embodiment of the present disclosure described above, it is possible to display a plurality of all-in-focus images with different virtual viewpoints without changing the position of the observation area selected by the user in the all-in-focus images. Therefore, the user may intuitively grasp the position of the observation area in the Z direction, the anteroposterior relationship with other structures, and the like without changing the line of sight to the observation area selected by the user.

Modification

Next, a modification of the fourth embodiment of the present disclosure will be described. In the fourth embodiment, the shift amount between adjacent slice images in each multi-focus superimposed image is made identical (refer to step S42). However, the shift amount between adjacent slice images even within one multi-focus superimposed image may be varied.

Figure 28A:
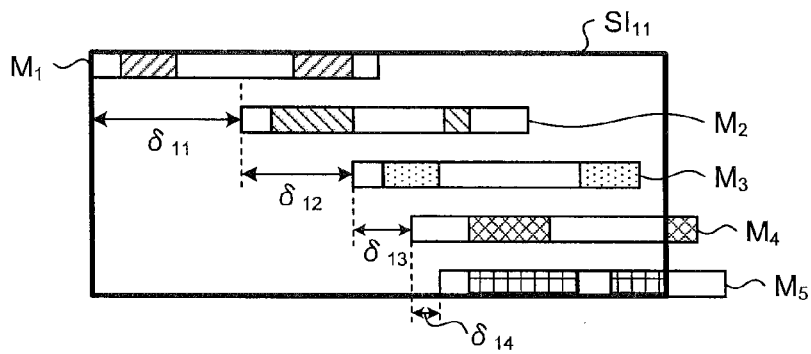
FIGS. 28A-28C are schematic diagrams illustrating a method of shifting a slice image according to a modification of the fourth embodiment.
Figure 28B:
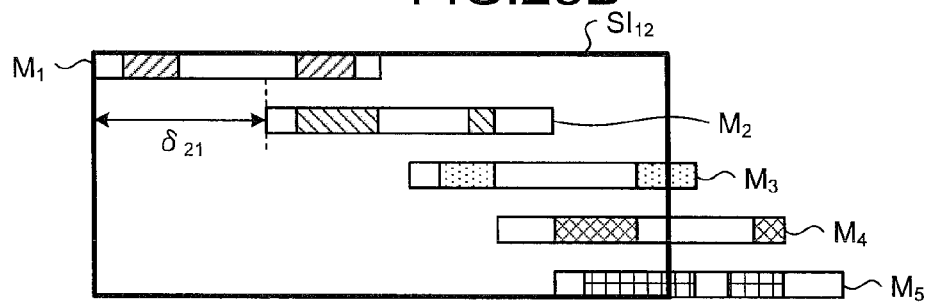
Figure 28C:
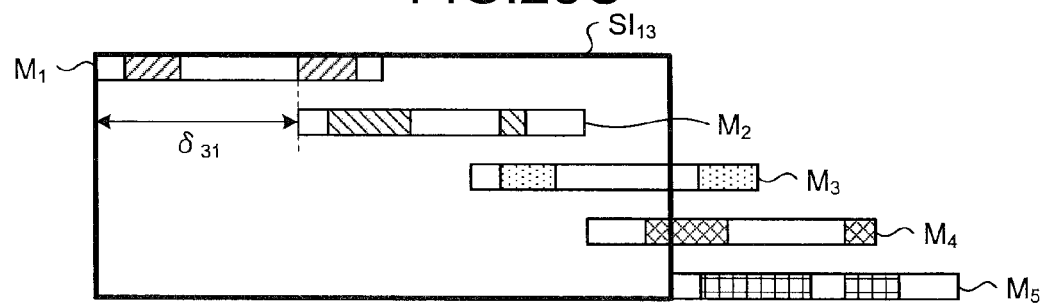

FIGS. 28A-28C are schematic diagrams illustrating a method of shifting a slice image according to the modification of the fourth embodiment, and illustrates three multi-focus superimposed images with a slice image $M_1$ as a reference image. A shift amount between the corresponding slice images among the multi-focus superimposed images $SI_{11}$, $SI_{12}$, and $SI_{13}$ illustrated in FIGS. 28A-28C (for example, the shift amount of a slice image $M_2$ with respect to the slice image $M_1$) becomes larger in order of the multi-focus superimposed images $SI_{11}$, $SI_{12}$, and $SI_{13}$ ($\delta_{11} < \delta_{21} < \delta_{31}$). Furthermore, in each multi-focus superimposed image, the shift amount between slice images increases as their slice positions are closer to the slice image $M_1$. For example, in the case of the multi-focus superimposed image $SI_{11}$, the shift amounts are in order of $\delta_{11} > \delta_{12} > \delta_{13} > \delta_{14}$ from the closest side to the slice image $M_1$.

Thus, the shift amount between slice images is increased as their slice positions are closer to a slice image including an observation area to which the user pays attention. In this way, it is possible to facilitate grasping of a structure in the slice image to which the user pays attention.

Furthermore, in the fourth embodiment, the shift amount is increased or decreased sequentially with respect to the uppermost slice image $M_1$ or the lowest slice image $M_5$ so that the slice images $M_1$ to $M_5$ are aligned in one direction. However, the increase or decrease of the shift amount may be varied according to the positional relationship of the slice images.

Figure 29A:
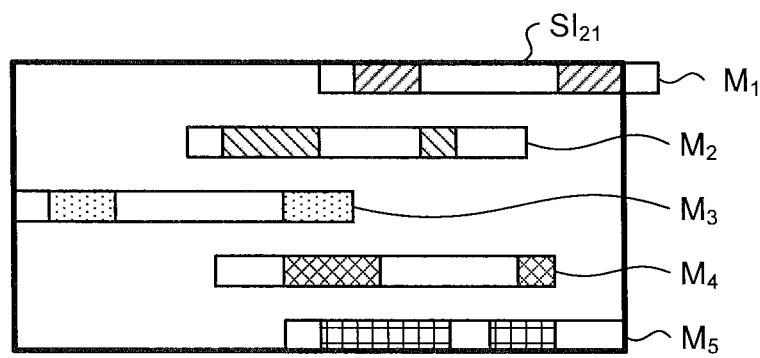
FIGS. 29A and 29B are schematic diagrams illustrating another method of shifting a slice image in the modification of the fourth embodiment.
Figure 29B:
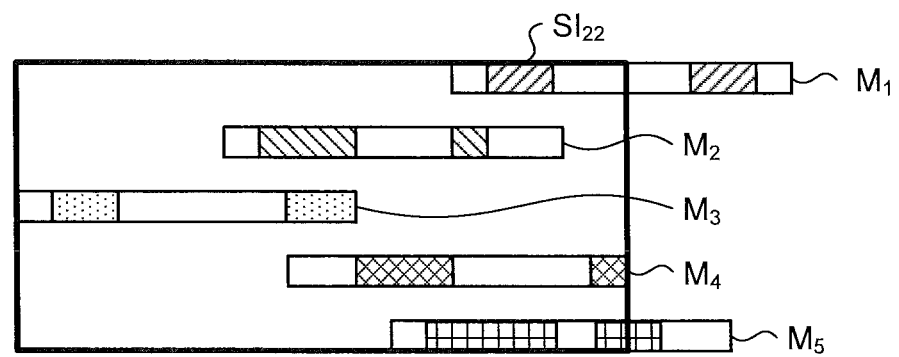

FIGS. 29A and 29B are schematic diagrams illustrating another method of shifting the slice image in the modification of the fourth embodiment, and illustrates two multi-focus superimposed images with a slice image $M_3$ as a reference image. In the multi-focus superimposed images $SI_{21}$ and $SI_{22}$ illustrated in FIGS. 29A and 29B, an increase and decrease in a shift amount according to a slice position are reversed at the slice image $M_3$. As a result, even when an all-in-focus image is generated, it becomes possible to more prominently display the slice position including the observation area selected by the user.

The above-described first to fourth embodiments and modifications are not limited as they are. It is possible to form various inventions by appropriately combining a plurality of constituent elements disclosed in each embodiment and modifications. For example, the inventions may be formed by excluding some constituent elements from all constituent elements illustrated in the embodiment. Alternatively, the inventions may be formed by appropriately combining the constituent elements illustrated in different embodiments.

According to the present disclosure, based on slice images acquired by performing imaging while shifting a focal position along an optical axis of an observation optical system, all-in-focus images are generated and displayed under conditions in which shift amounts of one slice image with respect to another slice image are different. Therefore, it is possible to reproduce a state of virtually viewing the object from a plurality of viewpoints. Thus, the user may visually and intuitively grasp a position of a structure in the Z direction and an anteroposterior relationship between structures.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscopy system, comprising:
    an image sensor configured to acquire slice images generated by capturing an object image while shifting a focal position along an optical axis of an observation optical system included in a microscope; and
    a controller comprising hardware, the controller being configured to:
        relatively shift, with respect to one slice image among the slice images, another slice image in a plane including the one slice image;
        generate all-in-focus images by combining the one slice image and the other slice image relatively shifted with respect to the one slice image under conditions in which shift amounts of the other slice image with respect to the one slice image are different;
        determine an area selected from any one of the all-in-focus images as an observation area in accordance with a performed operation;
        extract an area corresponding to the observation area from another all-in-focus image other than the all-in-focus image from which the observation area is selected, and extract a slice image including the observation area from the slice images, based on a shift amount between a position of the observation area in the all-in-focus image from which the observation area is selected and a position of the area in the other all-in-focus image from which the area is extracted; and
        display the all-in-focus images.

2. The microscopy system according to claim 1, wherein the controller is further configured to:
    receive input information corresponding to an operation;
    calculate the shift amount in each of the conditions in accordance with the received input information; and
    shift the other slice image in accordance with the calculated shift amount.

3. The microscopy system according to claim 1, wherein the controller determines a range to be used for generating each of the plurality of all-in-focus images with respect to the one slice image and the other slice image relatively shifted with respect to the one slice image, based on the position of the observation area in the all-in-focus image from which the observation area is selected.

4. A microscopy method comprising:
    acquiring slice images generated by capturing an object image while shifting a focal position along an optical axis of an observation optical system included in an microscope;
    shifting relatively, with respect to one slice image among the slice images, another slice image in a plane including the one slice image;
    generating all-in-focus images by combining the one slice image and the other slice image relatively shifted with respect to the one slice image under conditions in which shift amounts of the other slice image with respect to the one slice image are different;
    determining an area selected from any one of the all-in-focus images as an observation area in accordance with a performed operation;
    extracting an area corresponding to the observation area from another all-in-focus image other than the all-in-focus image from which the observation area is selected, and extract a slice image including the observation area from the slice images, based on a shift amount between a position of the observation area in the all-in-focus image from which the observation area is selected and a position of the area in the other all-in-focus image from which the area is extracted; and
    displaying the all-in-focus images.

5. A non-transitory computer-readable recording medium with an executable program stored thereon, the program causing a processor to execute:
    shifting relatively, with respect to one slice image among slice images, another slice image in a plane including the one slice image, the slice images being generated by capturing an object image while shifting a focal position along an optical axis of an observation optical system included in an microscope;
    generating all-in-focus images by combining the one slice image and the other slice image relatively shifted with respect to the one slice image under conditions in which shift amounts of the other slice image with respect to the one slice image are different;
    determining an area selected from any one of the all-in-focus images as an observation area in accordance with a performed operation;
    extracting an area corresponding to the observation area from another all-in-focus image other than the all-in-focus image from which the observation area is selected, and extract a slice image including the observation area from the slice images, based on a shift amount between a position of the observation area in the all-in-focus image from which the observation area is selected and a position of the area in the other all-in-focus image from which the area is extracted; and
    displaying the all-in-focus images.

* * * * *